United States Patent
Kondos et al.

(10) Patent No.: US 9,718,995 B2
(45) Date of Patent: Aug. 1, 2017

(54) COMPOSITIONS WITH ENHANCED FLEXIBILITY

(71) Applicant: Momentive Performance Materials Inc., Waterford, NY (US)

(72) Inventors: Constantine Kondos, White Plains, NY (US); Ping Jiang, New City, NY (US); Martin Wusik, Danbury, CT (US); Vikram Kumar, Tarrytown, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 14/596,388

(22) Filed: Jan. 14, 2015

(65) Prior Publication Data

US 2015/0203724 A1  Jul. 23, 2015

Related U.S. Application Data

(60) Provisional application No. 61/928,572, filed on Jan. 17, 2014.

(51) Int. Cl.

| | |
|---|---|
| C08G 18/61 | (2006.01) |
| C09J 125/14 | (2006.01) |
| C09D 125/14 | (2006.01) |
| C08G 18/62 | (2006.01) |
| C08G 18/79 | (2006.01) |
| C09D 175/04 | (2006.01) |
| C08G 18/40 | (2006.01) |
| C08G 77/16 | (2006.01) |
| C08G 77/18 | (2006.01) |
| C08G 77/00 | (2006.01) |

(52) U.S. Cl.
CPC ........ *C09J 125/14* (2013.01); *C08G 18/4009* (2013.01); *C08G 18/61* (2013.01); *C08G 18/6229* (2013.01); *C08G 18/6295* (2013.01); *C08G 18/792* (2013.01); *C09D 125/14* (2013.01); *C09D 175/04* (2013.01); C08G 77/16 (2013.01); C08G 77/18 (2013.01); C08G 77/80 (2013.01)

(58) Field of Classification Search
None
See application file for complete search history.

(56) References Cited

U.S. PATENT DOCUMENTS

| | | | |
|---|---|---|---|
| 3,829,505 A | 8/1974 | Herold | |
| 3,941,849 A | 3/1976 | Herold | |
| 4,202,807 A * | 5/1980 | Moretto | C08G 18/08 524/263 |
| 4,242,490 A | 12/1980 | Emerson et al. | |
| 4,335,188 A | 6/1982 | Igi et al. | |
| 4,413,086 A * | 11/1983 | Chang | C08G 18/61 524/386 |
| 4,687,851 A | 8/1987 | Laughner | |
| 4,985,491 A | 1/1991 | Reisch | |
| 5,072,051 A | 12/1991 | Pugach et al. | |
| 5,072,187 A | 12/1991 | Shilo | |
| 5,096,993 A | 3/1992 | Smith et al. | |
| 5,100,997 A | 3/1992 | Reisch et al. | |
| 5,106,874 A | 4/1992 | Porter et al. | |
| 5,116,931 A | 5/1992 | Reisch et al. | |
| 5,136,010 A | 8/1992 | Reisch et al. | |
| 5,185,420 A | 2/1993 | Smith et al. | |
| 5,266,681 A | 11/1993 | Reisch et al. | |
| 5,567,790 A * | 10/1996 | Okawa | C08G 77/08 528/14 |
| 5,684,080 A | 11/1997 | Van Der Heide et al. | |
| 5,684,084 A | 11/1997 | Lewin et al. | |
| 5,760,155 A * | 6/1998 | Mowrer | C08G 18/10 525/453 |
| 6,180,741 B1 * | 1/2001 | Yamaguchi | C08G 18/61 385/123 |
| 6,313,254 B1 * | 11/2001 | Meijs | A61L 15/26 428/15 |
| 6,660,943 B1 * | 12/2003 | Gotoh | H01L 21/563 174/260 |
| 8,101,704 B2 | 1/2012 | Baumann et al. | |
| 2003/0118837 A1 * | 6/2003 | Modha | A61L 31/048 428/423.1 |
| 2012/0214925 A1 * | 8/2012 | Gubbels | C08L 83/04 524/413 |
| 2013/0035466 A1 | 2/2013 | Vanlandschoot et al. | |
| 2013/0331509 A1 * | 12/2013 | Sharp | C08G 18/10 524/588 |
| 2014/0073720 A1 | 3/2014 | Geismann et al. | |

OTHER PUBLICATIONS

Written Opinion and Search Report PCT/US2015/011301 dated Apr. 1, 2015.

* cited by examiner

Primary Examiner — Robert S Loewe
(74) Attorney, Agent, or Firm — James C. Abruzzo

(57) ABSTRACT

Compositions are provided which comprises an active hydrogen-containing resin, a flexibilizer and at least one curing agent. The cured compositions possess enhanced flexibility while maintaining hardness, and are highly suitable for applications such as coatings, adhesives, sealants, gaskets, industrial rubber goods, and the like.

18 Claims, No Drawings

COMPOSITIONS WITH ENHANCED FLEXIBILITY

This application claims priority to Provisional U.S. Patent Application No. 61/928,572 dated Jan. 17, 2014, the entire contents of which are incorporated herein by reference in their entirety.

BACKGROUND OF THE INVENTION

1. Field of the Invention

The present invention relates to compositions that upon curing provide cured compositions having enhanced flexibility. These compositions are useful as coatings, adhesives, sealants and composites.

2. Description of Related Art

Resin compositions are useful as adhesives, sealants, composites, and especially coatings. Current high surface hardness protective coatings typically contain acrylic resins having high glass transition temperature (Tg), such as acrylic resins derived from methyl methacrylate and styrene monomers or alkoxysilane-modified acrylic resins, for example, acrylic resins incorporating (meth)acryloxyalkoxysilane, such as 3-methacryloxypropyltrialkoxysilane. While such acrylic-based coating compositions are useful in forming protective coatings having a high hardness, the coatings formed tend to crack after outdoor exposure for a period of time.

Accordingly, there is a continuing need for compositions having enhanced flexibility while maintaining hardness.

SUMMARY OF THE INVENTION

In accordance with one aspect of the invention, there is provided a composition comprising:

(a) flexibilizer (i) having general formula (I):

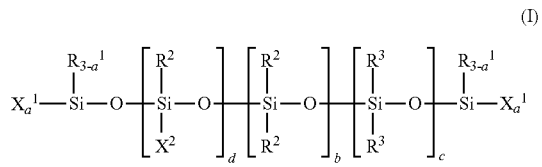

wherein:

each occurrence of $R^1$ is independently an alkyl group having from 1 to 6 carbon atoms, a phenyl group or an arenyl group having 7 to 12 carbon atoms;

each occurrence of $R^2$ is independently an alkyl group having from 1 to 6 carbon atoms;

each occurrence of $R^3$ is independently a phenyl group or an arenyl group having 7 to 12 carbon atoms;

each occurrence of $X^1$ is independently a hydroxyl group, an alkoxy group having from 1 to 6 carbon atoms, or an alkoxy group having from 1 to 6 carbon atoms and at least one ether or ester functional group;

each occurrence of $X^2$ is independently a hydroxyl group, an alkoxy group having from 1 to 6 carbon atoms, an alkoxy group having from 1 to 6 carbon atoms and at least one ether or ester functional group, or a group with the formula (II):

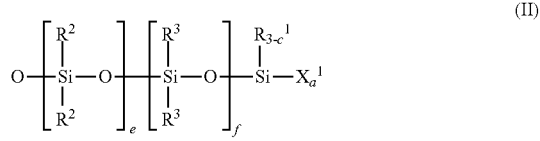

wherein:

$R^1$, $R^2$ and $R^3$ are the same as defined above;

each occurrence of subscripts a, b, c, d, e and f is independently an integer wherein a is 1 to 3; b is 0 to 500, c is 1 to 500, d is 0 to 10, e is 0 to 50, and f is 0 to 50 with the provisos that (1) the molar ratio of b to c is from 0:1 to 15:1, and (2) the molar ratio of d to c is from 0:1 to 1:1;

(b) at least one active hydrogen-containing resin (ii) selected from the group consisting of polyol (iii), amine-functional resin (iv) and mercapto-functional resin (v); and, (c) at least one curing agent (vi) selected from the group consisting of isocyanate-containing compound (vii), blocked isocyanate-containing compound (viii) and aminoplast (ix).

The present invention provides compositions having enhanced flexibility while maintaining hardness. The compositions of the present invention are especially useful for the manufacture of coatings, sealants, adhesives, gaskets, and the like.

DETAILED DESCRIPTION OF PREFERRED EMBODIMENTS

In the specification and claims herein, the following terms and expressions are to be understood as indicated below.

It will also be understood that any numerical range recited herein is intended to include all sub-ranges within that range and any combination of end points of said ranges or sub-ranges.

It is to be understood that the terminology used herein is for purposes of describing particular embodiments only and is not intended to limit the scope of the present teachings which will be limited only by the appended claims.

Throughout the application, where a composition is described as having, including, or comprising specific components, it is contemplated that such composition also consists essentially of, or consists of, the recited components.

The use of the singular herein, for example, "a," "an," and "the," includes the plural (and vice versa) unless specifically stated otherwise.

In the application, where a component or material is said to be included in and/or selected from a list of recited components or materials, it is to be understood that the component or material can be any one of the recited components or materials or any combination thereof.

The use of the terms "include," "includes," "including," "have," "has," "having," "contain," "contains," or "containing," including grammatical equivalents thereof, should be generally understood as open-ended and non-limiting, for example, not excluding additional unrecited components or steps, unless otherwise specifically stated or understood from the context.

As used herein, the term "monovalent" in reference to a group means that the group is capable of forming one covalent bond per group.

As used herein, the term "hydrocarbon group" is a group consisting of carbon and hydrogen atoms and includes acyclic hydrocarbon groups, alicyclic hydrocarbon groups and aromatic hydrocarbon groups.

As used herein, the term "acyclic hydrocarbon group" means any straight chain or branched hydrocarbon group, preferably containing from 1 to 60 carbon atoms, which may be saturated or unsaturated. Suitable monovalent acyclic hydrocarbon groups include alkyl, alkenyl and alkynyl groups. Representative and non-limiting examples of monovalent acyclic hydrocarbon groups are methyl, ethyl, sec-butyl, tert-butyl, octyl, decyl, dodecyl, cetyl, stearyl, ethenyl, propenyl, and butynyl. Suitable divalent acyclic hydrocarbon groups include linear or branched alkylene groups. Representative and non-limiting examples of divalent acyclic hydrocarbon groups are methylene, ethylene, propylene, hexylene, methylethylene, 2-methylpropylene and 2,2-dimethylpropylene. Suitable trivalent acyclic hydrocarbon radicals include alkanetriyl radicals, such as, for example, 1,1,2-ethanetriyl, 1,2,4-butanetriyl, 1,2,8-octanetriyl and 1,2,4-hexanetriyl.

As used herein the term "alkyl" means any saturated straight or branched monovalent hydrocarbon group. In a preferred embodiment, monovalent alkyl groups are selected from linear or branched alkyl groups containing from 1 to 60 carbons per group, such as, for example, methyl, ethyl, propyl, iso-propyl, n-butyl, iso-butyl, sec-butyl, tert-butyl, pentyl, hexyl, heptyl, decyl and dodecyl.

As used herein the term "alkenyl" means any straight or branched monovalent hydrocarbon group containing at least one carbon-carbon double bond and preferably containing from 2 to 10 carbon atoms, such as, for example, ethenyl, 2-propenyl, 3-butenyl, 5-hexenyl and 7-octenyl.

As used herein the term "arenyl" means any aromatic hydrocarbon group in which one or more hydrogen atoms have been substituted by the same number of like and/or different alkyl groups. In a preferred embodiment, arenyl includes 4-methylphenyl, 2,4-dimethylphenyl and 2,4,6-trimethylphenyl.

As used herein, the term "alicyclic hydrocarbon group" means a group containing one or more hydrocarbon rings, preferably containing from 3 to 12 carbon atoms, which may optionally be substituted on one or more of the rings with one or more monovalent or divalent acyclic group containing preferably 1 to 6 carbon atoms. In the case of an alicyclic hydrocarbon group containing two or more rings, the rings may be fused rings in which the two rings share two or more carbon atoms in common, or rings that are bonded to each other through a covalent bond or divalent acyclic group. Suitable monovalent alicyclic hydrocarbon groups include, for example, cycloalkyl groups, such as cyclohexyl and cyclooctyl or cycloalkenyl groups, such as cyclohexenyl. Suitable divalent hydrocarbon groups include, saturated or unsaturated divalent monocyclic hydrocarbon radicals, such as, for example, 1,4-cyclohexylene. Suitable trivalent alicyclic hydrocarbon radicals include cycloalkanetriyl radicals such as, for example, 1-ethylene-2,4-cyclohexylene and 1-methylethylene-3-methyl-3,4-cyclohexylene.

As used herein, the term "aromatic hydrocarbon group" means a hydrocarbon group containing one or more aromatic rings, which may, optionally, be substituted on the aromatic rings with one or more monovalent or divalent acyclic groups preferably containing 1 to 6 carbon atoms. In the case of an aromatic hydrocarbon group containing two or more rings, the rings may be fused rings in which the rings share two or more carbon atoms in common, or rings that are bonded to each other through a covalent bond or divalent acyclic group. Suitable monovalent aromatic hydrocarbon include, for example, phenyl, tolyl, 2,4,6-trimethylphenyl, naphthyl and anthryl, as well as aralkyl groups, such as, for example, 2-phenylethyl. Suitable divalent aromatic hydrocarbon groups include divalent monocyclic arene groups such as, for example, 1,2-phenylene, 1,4-phenylene, 4-methyl-1,2-phenylene and phenylmethylene. Suitable trivalent aromatic hydrocarbon groups include, for example, 1,3,5-phenylene and 1,2,4-phenylene.

Flexibilizer (i)

Flexibilizer (i) is a polysiloxane compound represented by general formula (I):

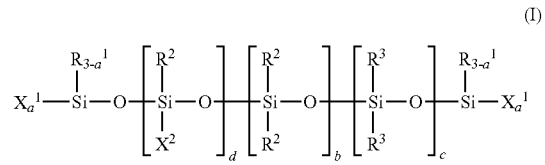

wherein:

each occurrence of $R^1$ is independently an alkyl group having from 1 to 6 carbon atoms, a phenyl group or an arenyl group having 7 to 12 carbon atoms;

each occurrence of $R^2$ is independently an alkyl group having from 1 to 6 carbon atoms;

each occurrence of $R^3$ is independently a phenyl group or an arenyl group having 7 to 12 carbon atoms;

each occurrence of $X^1$ is independently a hydroxyl group, an alkoxy group having from 1 to 6 carbon atoms, or an alkoxy group having from 1 to 6 carbon atoms and at least one ether or ester functional group;

each occurrence of $X^2$ is independently a hydroxyl group, an alkoxy group having from 1 to 6 carbon atoms, an alkoxy group having from 1 to 6 carbon atoms and at least one ether or ester functional group, or a group with the formula (II):

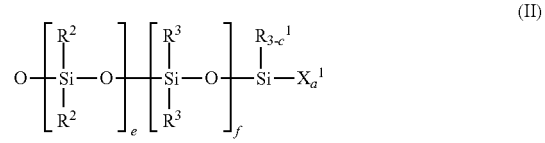

wherein:

$R^1$, $R^2$ and $R^3$ are the same as defined above;

each occurrence of subscripts a, b, c, d, e and f is independently an integer wherein a is 1 to 3; b is 0 to 500, c is 1 to 500, d is 0 to 10, e is 0 to 50, and f is 0 to 50 with the provisos that (1) the molar ratio of b to c is from 0:1 to 15:1, and (2) the molar ratio of d to c is from 0:1 to 1:1.

The repeat units of general formula (II) may be oriented in blocks or randomly, and is generally a mixture of components with the structure of formula (II).

In certain embodiments of the composition of this invention, in flexibilizer (i) of formula (I), each occurrence of $X^1$ is independently hydroxyl, methoxy, ethoxy, propoxy or isopropoxy; $R^1$ is methyl or phenyl; $R^2$ is methyl; $R^3$ is phenyl; b is 1 to 100; c is 2 to 100; d is 0; and the molar ratio of b to c is from 0.5:1 to 10:1. Preferably, $X^1$ is hydroxyl, methoxy or ethoxy; d is 0; and the molar ratio of b to c is 2:1 to 7:1.

Specific examples of flexibilizers (i) include HO—Si(CH$_3$)$_2$—O—[Si(CH$_3$)$_2$O]$_r$—[Si(Ph)$_2$O]$_s$—Si(CH$_3$)$_2$—OH where r/s is 4, CH$_3$O—Si(CH$_3$)$_2$—O—[Si(CH$_3$)$_2$O]$_u$–[Si(Ph)$_2$O]$_w$—Si(CH$_3$)$_2$—OCH$_3$ where u/w is 3, Ph is phenyl, or mixtures thereof.

In another embodiment, flexibilizer (i) of formula (I) has a silanol content or a SiX$^1$ content of from 2 to 15 mole %, and preferably from 5 to 10 mole %, based upon the total number of silicon atoms and determined by $^{29}$Si NMR spectroscopy. In still another embodiment, flexibilizer (i) has a weight average molecular weight of from 500 to 50,000, preferably from 1,000 to 10,000, as determined in accordance with DIN Standard 55672 (1) using polystyrene standards.

The amount of flexibilizer (i) of formula (I) that is used in the compositions is from 1 to 50 parts by weight per one hundred parts of active hydrogen-containing resin (ii), more specifically from 1 to 30 parts by weight per one hundred parts of such resin.

Active Hydrogen-Containing Resin (ii)

Active hydrogen-containing resin (ii) is at least one member selected from the group consisting of polyol (iii), amine-functional resin (iv) and mercapto-functional resin (v).

(1) Polyol (iii)

In one embodiment, polyol (iii) is at least one member selected from the group consisting of acrylic polyol, polyether polyol, polyester polyol, polyetherester polyol, hydroxyl-terminated polybutadiene, hydroxyl-terminated polyurethane, polyesterether polyol and acrylic polyol containing a alkoxysilyl group.

In one preferred embodiment, polyol (iii) is acrylic polyol containing an alkoxysilyl group.

Suitable polyols (iii) include poly(oxyalkylene)ether diols (i.e., polyether dials), in particular, poly(oxyethylene)ether diols, poly(oxypropylene)ether diols and poly(oxyethylene-oxypropylene)ether diols, poly(oxyalkylene)ether triols, poly(tetramethylene)ether glycols, polyacetals, polyhydroxy polyacrylates, polyhydroxy polyester amides, polyhydroxy polythioethers, polycaprolactone diols and triols, polybutadiene diols, and the like, with number average molecular weights (Mn) between 500 and 25,000 grams per mole. The number average molecular weights are determined in accordance with DIN Standard 55672 (1) using polystyrene standards.

In one embodiment of the invention, suitable polyols (iii) are poly(oxyethylene)ether diols with number average molecular weights (Mn) between 500 and 25,000 grams per mole. In another embodiment of the invention, the polyols used in the production of active hydrogen-containing resin (ii) are poly(oxypropylene)ether diols with number average molecular weights between 1,000 and 20,000 grams per mole. The number average molecular weights are determined in accordance with DIN Standard 55672 (1) using polystyrene standards. Mixtures of polyols of various structures, molecular weights and/or functionalities can also be used.

The polyether polyols can have a functionality of up to 12, more specifically a functionality of from 1.5 to 8 and even more specifically, a functionality of from 1.8 to 2.2. Suitable polyols (iii) are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505, 3,941,849, 4,242,490, 4,335,188, 4,687,851, 4,985,491, 5,096,993, 5,100,997, 5,106,874, 5,116,931, 5,136,010, 5,185,420 and 5,266,681, the entire contents of which are incorporated by reference herein. Polyether polyols produced in the presence of such catalysts tend to have high molecular weights and low levels of unsaturation, properties which are believed to account for the improved performance of compositions derived therefrom. The polyether polyols preferably have a number average molecular weight of from 1,000 to 25,000 grams per mole, more preferably from 2,000 to 20,000 grams per mole and more preferably still from 4,000 to 18,000 grams per mole. The levels of terminal ethylenic unsaturation are generally less than 0.2, preferably less than 0.02, and more preferably less than 0.008 milliequivalents per gram (meq/g) of polyol. Examples of commercially available diols that are suitable for making polyol (iii) herein include, but are not limited to, ARCOL® R-1819 (number average molecular weight of 8,000 grams per mole, available from Bayer Material Science), E-2204 (number average molecular weight of 4,000 grams per mole) and ARCOL® E-2211 (number average molecular weight of 11,000 grams per mole, available from Bayer Material Science).

Among the hydroxyl-terminated polybutadiene representatives of polyol (iii) are those possessing a number average molecular weight of from 500 to 10,000 grams per mole and advantageously from 800 to 5,000 grams per mole, a primary hydroxyl group content of from 0.1 to 6.0 milliequivalents per gram and advantageously from 0.3 to 1.8 milliequivalents per gram, a degree of hydrogenation of from 0 up to 100 percent of the olefinic sites present and an average content of copolymerized additional monomer(s) of from 0 up to 50 weight percent.

Hydroxyl-terminated polybutadienes of the above-described type, averaging more than one predominantly primary hydroxyl group per molecule, for example, averaging from 1.7 to 3 or more primary hydroxyl groups per molecule, are suitably employed herein. More specifically, the hydroxyl-terminated polybutadienes possess an average of at least 2, and advantageously from 2.4 up to 2.8, hydroxyl groups per molecule, the hydroxyl groups being predominantly in terminal allylic positions on the main, i.e., generally the longest, hydrocarbon chain of the molecule. By "allylic" configuration is meant that the alpha-allylic grouping of allylic alcohol, i.e., the terminal hydroxyl groups of the polymer, are bonded to carbon atoms adjacent to double bonded carbon atoms.

The ratio of cis-1,4, trans-1,4 and 1,2-vinyl unsaturation which occurs in the butadiene polymers employed in this invention, the number and location of the hydroxyl groups and the molecular weight of the butadiene polymers will be influenced by the process employed for their manufacture, the details of which are known in the art.

Hydroxyl-terminated polybutadienes possessing these characteristics are commercially available from several sources and are therefore conveniently employed herein.

The useful hydroxyl-terminated polybutadienes herein can also incorporate one or more other copolymerizable monomers which can confer particularly desirable properties upon the silylated polymers herein. The total amount of copolymerized monomer will not exceed, on average, 50 weight percent of the hydroxyl-terminated polybutadiene copolymer. Included among the copolymerizable monomers are monoolefins and dienes such as ethylene, propylene, 1-butene, isoprene, chloroprene, 2,3-methyl-1,3-butadiene, 1,4-pentadiene, etc., and, ethylenically unsaturated monomers such as acrylonitrile, methacrylonitrile, methylstyrene, methyl acrylate, methyl methacrylate, vinyl acetate, etc. Alternatively or in addition thereto, the hydroxyl-terminated polybutadienes can be reacted with one or more other monomers to provide hydroxyl-terminated block copolymers. Such monomers include 1,2-epoxides such as ethylene oxide and propylene oxide which will provide polyether segments, e-caprolactone which will provide polyester segments, and the like.

Hydroxyl-terminated polyurethane representatives of polyol (iii) can be prepared from the reaction of a stoichiometric excess, usually slight excess, of one or more polyols such as any of those previously mentioned and one or more polyisocyanates such as any of those listed below, optionally together with one or more chain extenders in accordance with known and conventional methods. Examples of suitable chain extenders are polyhydric alcohols such as ethylene glycol, propylene glycol, propane-1,3-diol, butane-1,4-diol, hexane-1,6-diol, diethylene glycol, triethylene glycol, tetraethylene glycol, dipropylene glycol, triethylene glycol, tetrathylene glycol, dipropylene glycol, tripropylene glycol, tetrapropylene glycol and the like. Additional polyols can be chosen from polyols described above and include polyether polyols, polyester polyols, polyetherester polyols, polyesterether polyols, polybutadienediols, polyoxyalkylene diols, polyoxyalkylene triols, polytetramethylene glycols, polycaprolactone diols and triols, and the like, all of which possess at least two primary hydroxyl groups.

In one embodiment, acrylic polyols representative of polyols (iii) can be acrylosilane polymers obtained from the copolymerization of at least one monomer selected from the group consisting of alkyl methacrylate, alkyl acrylate, each having from 1-12 carbon atoms in the alkyl group, isobornyl methacrylate, isobornyl acrylate, hydroxy alkyl acrylate, each having from 1-4 carbon atoms, and styrene, and at least one ethylenically unsaturated silane monomer, e.g., ethylenically unsaturated silane monomer having the general formulae (III)-(V):

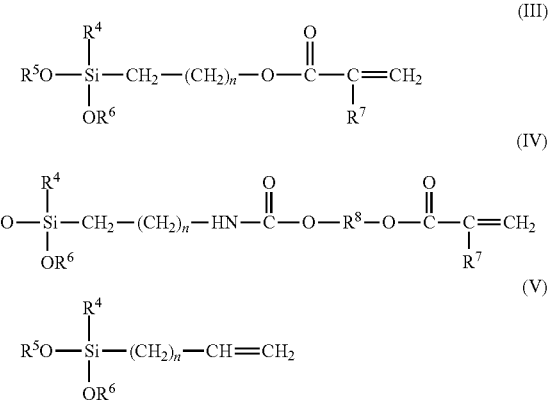

wherein:
R$^4$ is methyl, ethyl, methoxy, ethoxy, propoxy or isopropoxy;
each R$^5$ and R$^6$ are independently hydrogen, methyl, ethyl, propyl or isopropyl;
R$^7$ is hydrogen, methyl or ethyl;
R$^8$ is an alkylene group having from 2 to 8 carbon atoms; and,
the subscript n is an integer of from 0 to 8.

In another preferred embodiment, active hydrogen-containing resin (ii) is an acrylic polyol containing an alkoxysilyl group which consists essentially of polymerized monomers selected from the group consisting of alkyl methacrylate and an alkyl acrylate having from 1 to 12 carbon atoms in the alkyl group, hydroxy alkyl methacrylate and hydroxy alkyl acrylate having from 1 to 4 carbon atoms in the alkyl group, isobornyl methacrylate, isobornyl acrylate, styrene and any mixtures thereof in combination with ethylenically unsaturated silane monomer (III), above, wherein R$^4$ is methyl, ethyl, methoxy or ethoxy; each R$^5$ and R$^6$ are independently methyl or ethyl; R$^7$ is hydrogen or methyl; and, the subscript n is an integer of from 0 to 2.

(2) Amine-Functional Resin (iv)

In one embodiment, amine-functional resin (iv) is represented by general formula (VI):

wherein:
R$^9$ is hydrogen, a linear, cyclic or branched hydrocarbon group having from 1 to 18 carbon atoms, which is optionally substituted by heteroatoms, such as an alkyl radical which is interrupted by nonadjacent oxygen atoms, an alkoxy group —OR$^{11}$ or an acyloxy group —O—C(=O)—R$^{12}$ wherein R$^{11}$ is hydrogen or a linear, cyclic or branched hydrocarbon group having from 1 to 18 carbon atoms and R$^{12}$ is a hydrogen or a hydrocarbon contain from 1 to 18 carbon atoms;
R$^{10}$ is a linear or branched polymer group having a number average molecular weight of from 500 to 25,000, as determined in accordance with DIN Standard 55672 (1) using polystyrene standards; and,
g is an integer greater than 1.

In one embodiment, amine-functional resin (iv) is at least one of amino-terminated poly(alkylene oxide), amine-terminated polyurethane and amine-terminated polyamide. Suitable amine-functional resins (iv) include Desmophen NH 1420 from Bayer and Jeffamine D-2000 from Huntsman.

(3) Mercapto-Functional Resin (v)

In one embodiment, mercapto-functional resin (v) is represented by general formula (VII):

wherein:
R$^{13}$ is a linear or branched polymer group having a number average molecular weight of from 500 to 25,000, as determined in accordance with DIN Standard 55672 (1) using polystyrene standards; and,
h is an integer greater than 1.

In one embodiment, mercapto-functional resin (v) is a mercapto-terminated polysulfide, a mercapto-terminated poly(alkylene oxide) or a mercapto-terminated polyurethane. Suitable mercapto-functional resins (v) include Thioplast G 44 from Akzo Nobel.

Mercapto-functional resin (v) includes thiol ester compounds having an average of two or more thiol groups.

The thiol ester can be a compound having an average of at least 1.5 ester groups and an average of at least 1.5 thiol groups. Suitable thiol ester compounds can also include one or more cyclic sulfide groups in which the ratio of such sulfide group(s) to thiol group(s) is less than 1.5.

Generally, the thiol ester compound contains at least one ester group and greater than one thiol group. The thiol ester compound can be produced from any unsaturated ester. For instance, the thiol ester can be derived from an unsaturated natural source oil or from an unsaturated triglyceride. In some instances, the thiol ester compound can be described as a mercaptanized unsaturated ester wherein the unsaturated ester can be any unsaturated ester described herein. For instance, the thiol ester can be a mercaptanized unsaturated natural source oil or a mercaptanized unsaturated triglyceride. Because the feedstock unsaturated esters can contain multiple carbon-carbon double bonds per unsaturated ester molecule, carbon-carbon double bond reactivity and statistical probability dictate that each thiol ester molecule of the thiol ester composition produced from the unsaturated ester composition may not have the same number of thiol groups, number of unreacted carbon-carbon double bonds, number of cyclic sulfides, molar ratio of carbon-carbon double bonds to thiol groups, molar ratio of cyclic sulfides to thiol groups, and other quantities of functional groups and molar ratios disclosed herein as the feedstock unsaturated ester. Additionally, the feedstock unsaturated esters can also comprise a mixture of individual unsaturated esters having a different number of carbon-carbon double bonds and/or ester groups. Thus, many of these properties may be stated as an average number of the groups per thiol ester molecule within the thiol ester composition, or average ratio per thiol ester molecule within the thiol ester composition. In other embodiments, it is desired to control the content of thiol sulfur present in the thiol ester. Because it is difficult to ensure that the hydrogen sulfide reacts with every carbon-carbon double bond within the unsaturated ester, certain molecules of thiol ester can have more or less thiol groups than other molecules. Thus, the weight percent of thiol groups is stated as an average across all thiol ester molecules of the thiol ester compound(s).

The thiol ester compound can be derived from any unsaturated ester described herein. The thiol ester can be described as comprising one or more separate or discrete functional groups of the thiol ester compound(s). These independent functional groups can include: the number of (or average number of) ester groups per thiol ester molecule, the number of (or average number of) thiol groups per thiol ester molecule, the number of (or average number of) unreacted carbon-carbon double bonds per thiol ester molecule, the average thiol sulfur content of the thiol ester compound(s), the percentage (or average percentage) of sulfide linkages per thiol ester molecule, and the percentage (or average percentage) of cyclic sulfide groups per thiol ester molecule. Additionally, the thiol ester compound(s) can be described using individual or a combination of ratios including the ratio of double bonds to thiol groups, the ratio of cyclic sulfides to mercaptan group, and the like.

Minimally, in some embodiments, the thiol ester compound(s) have at least one ester group and one thiol group per thiol ester molecule. As the thiol ester is prepared from unsaturated esters, the thiol ester can contain the same number of ester groups as the unsaturated esters described herein. In an embodiment, the thiol ester compound(s) have an average of at least 1.5 ester groups per thiol ester molecule. Alternatively, the thiol ester molecules have an average of at least 2 ester groups per thiol ester molecule, alternatively, an average of at least 2.5 ester groups per thiol ester molecule; or alternatively, an average of at least 3 ester groups per thiol ester molecule. In other embodiments, the thiol esters have an average of from 1.5 to 8 ester groups per thiol ester molecule; alternatively, an average of from 2 to 8 ester groups per thiol ester molecule; alternatively, an average of from 2.5 to 5 ester groups per thiol ester molecule; or alternatively, an average of from 3 to 4 ester groups per thiol ester molecule. In yet other embodiments, the thiol ester comprises an average of about 3 ester groups per thiol ester molecule, or alternatively, an average of about 4 ester groups per unsaturated ester molecule.

Minimally, the thiol ester comprises an average greater than one thiol group per thiol ester molecule. In an embodiment, the thiol ester molecules have an average of at least 1.5 thiol groups per thiol ester molecule; alternatively, an average of at least 2 thiol groups per thiol ester molecule; alternatively, an average of at least 2.5 thiol groups per thiol ester molecule; or alternatively, an average of at least 3 thiol groups per thiol ester molecule. In other embodiments, the thiol ester compound(s) have an average of from 1.5 to 9 thiol groups per thiol ester molecule; alternatively, an average of from 2 to 9 thiol groups per thiol ester molecule; alternatively, an average of from 2 to 6 thiol groups per thiol ester molecule, or alternatively, an average of from 3 to 8 thiol groups per thiol ester molecule.

In some embodiments, the thiol ester compound(s) can have an average of from 2 to 8 ester groups per thiol ester molecule, and an average of from 2 to 9 thiol groups per thiol ester molecule; alternatively, an average of from 2 to 7 ester groups per thiol ester molecule, and an average of from 2 to 8 thiol groups per thiol ester molecule; or alternatively, an average of from 2.5 to 5 ester groups per thiol ester molecule, and an average of from 2 to 6 thiol groups per thiol ester molecule.

In a non-limiting embodiment, the thiol ester includes compounds derived from unsaturated ester, e.g., at least one of unsaturated natural source oil, unsaturated triglyceride, mercaptanized unsaturated natural source oil and mercaptanized unsaturated triglyceride. In these and other non-limiting embodiments, the thiol ester molecules can have an average of from 2 to 8 ester groups per thiol ester molecule and an average of from 2 to 9 thiol groups per thiol ester molecule; or alternatively, an average of from 2.5 to 5 ester groups per thiol ester molecule and an average of from 2 to 6 thiol groups per thiol ester molecule.

In other embodiments, the thiol ester compound(s) can be described by the average amount of thiol sulfur present therein. In one embodiment, the thiol ester molecules have an average of at least 5 weight percent thiol sulfur per thiol ester molecule; alternatively, an average of at least 10 weight percent thiol sulfur per thiol ester molecule, or alternatively, an average of greater than 15 weight percent thiol sulfur per thiol ester molecule. In another embodiment, the thiol ester compound(s) have an average of from 5 to 25 weight percent thiol sulfur per thiol ester molecule; alternatively, an average of from 5 to 20 weight percent thiol sulfur per thiol ester molecule; alternatively, an average of from 6 to 15 weight percent thiol sulfur per thiol ester molecule; or alternatively, an average of from 8 to 10 weight percent thiol sulfur per thiol ester molecule.

Generally, the location of the thiol group of the thiol ester is not particularly important and will be dictated by the method used to produce the thiol ester. In embodiments wherein the thiol ester is produced by contacting an unsaturated ester with hydrogen sulfide, the position of the thiol group will be dictated by the position of the carbon-carbon double bond. When the carbon-carbon double bond is an internal carbon-carbon double bond, the method of producing the thiol ester will result in a secondary thiol group. However, when the double bond is located at a terminal position it is possible to choose reaction conditions to produce a thiol ester comprising either a primary thiol group or a secondary thiol group. In one embodiment, the thiol ester composition can comprise, or consist essentially of, thiol ester molecules comprising one or more secondary thiol groups.

Some methods of producing the thiol ester compounds additionally can create sulfur-containing functional groups other than a thiol group. For example, in some thiol ester production methods, an introduced thiol group can react with a carbon-carbon double bond within the same unsaturated ester to produce a sulfide linkage. When the reaction is with a double bond of a second unsaturated ester, this produces a simple sulfide linkage. However, in some instances, the second carbon-carbon double bond is located in the same unsaturated ester molecule. When the thiol group reacts with a second carbon-carbon double bond within the same unsaturated ester molecule, a sulfide linkage is produced. In some instances, the carbon-carbon double bond can be within a second ester group of the unsaturated ester molecule. While in other instances, the carbon-carbon double bond can be within the same ester group of the unsaturated ester molecule.

When the thiol group reacts with the carbon-carbon double bond in a second ester group of the same unsaturated ester molecule, the resulting cyclic sulfide will contain two ester groups contained within a ring structure. When the thiol group reacts with the carbon-carbon double bond within the same ester group, the resulting cyclic sulfide will not contain an ester group within the ring structure. Within this specification, this second type of cyclic sulfide is referred to as a cyclic sulfide. Within this specification, the first type of cyclic sulfide is referred to as a simple sulfide. In the cyclic sulfide case, the sulfide linkage produces a cyclic sulfide functionality within a single ester group of the thiol ester. This linkage is termed a cyclic sulfide for purposes of this application. One such sulfide group that can be produced is a cyclic sulfide. The cyclic sulfide rings that can be produced include a tetrahydrothiopyran ring, a thietane ring, or a thiophane ring (tetrahydrothiophene ring).

In some embodiments, it is desirable to control the average amount of sulfur present as cyclic sulfide in the thiol ester. In an embodiment, the average amount of sulfur present as cyclic sulfide in the thiol ester molecules comprises less than 30 mole percent. Alternatively, the average amount of sulfur present as cyclic sulfide in the thiol ester molecules comprises less than 20 mole percent; alternatively, less than 10 mole percent; alternatively, less than 5 mole percent; or alternatively, less than 2 mole percent. In other embodiments, it is desired to control the molar ratio of cyclic sulfide groups to thiol groups. In an embodiment, the average molar ratio of cyclic sulfide groups to thiol group per thiol ester molecule is less than 1.5. Alternatively, the average molar ratio of cyclic sulfide groups to thiol group per thiol ester molecule is less than 1; alternatively, less than 0.5; alternatively, less than 0.25; or alternatively, less than 0.1. In some embodiments, the ratio of cyclic sulfide groups to thiol group per thiol ester ranges from 0 to 1; alternatively, the average molar ratio of cyclic sulfide groups to thiol group per thiol ester molecule ranges between 0.05 and 1; alternatively, between 0.05 and 0.75; alternatively, between 0.05 and 0.5; or alternatively, between 0.05 and 0.25.

In some instances it can desirable to have carbon-carbon double bonds present in the thiol ester compound(s), while in other embodiments it can be desirable to minimize the number of carbon-carbon double bonds present in the thiol ester compound(s). The presence of carbon-carbon double bonds present in the thiol ester can be stated as an average molar ratio of carbon-carbon double bonds to thiol-sulfur. In one embodiment, the average ratio of the remaining unreacted carbon-carbon double bond in a thiol ester compound to thiol sulfur is less than 1.5 per thiol ester molecule. Alternatively, the average ratio of carbon-carbon double bond to thiol sulfur is less than 1.2 per thiol ester molecule; alternatively, less than 1.0 per thiol ester molecule; alternatively, less than 0.75 per thiol ester molecule; alternatively, less than 0.5 per thiol ester molecule; alternatively, less than 0.2 per thiol ester molecule; or alternatively, less than 0.1 per thiol ester molecule.

In particular embodiments, the thiol ester is produced from an unsaturated ester compound. Because the feedstock unsaturated ester has particular compositions having a certain number of ester groups present, the product thiol ester composition will have about the same number of ester groups per thiol ester molecule as the feedstock unsaturated ester. Other, independent thiol ester properties described herein can be used to further describe the thiol ester compound(s).

In some embodiments, the thiol ester compound(s) are produced from unsaturated esters having an average of less than 25 weight percent of side chains having 3 contiguous methylene interrupted carbon-carbon double bonds, as described herein. In some embodiments, greater than 40 percent of the thiol containing natural source total side chains can include sulfur. In some embodiments, greater than 60 percent of the thiol ester molecule total side chains can include sulfur. In other embodiments, greater than 50, 70, or 80 percent of the thiol ester molecule total side chains can include sulfur.

The thiol ester compound(s) also can be described as product(s) obtained by the process comprising contacting hydrogen sulfide and an unsaturated ester composition wherein the unsaturated ester can be any unsaturated ester described herein, and can be further limited by the process as described herein. The thiol esters derived from an unsaturated natural source oil or derived from an unsaturated triglyceride also can be described using a molecular weight or an average molecular weight of the side chains. Alternatively, the thiol ester compound(s) can be described as a mercaptanized unsaturated ester, wherein the unsaturated ester can be any unsaturated ester described herein. The thiol esters described as a mercaptanized unsaturated natural source oil or a mercaptanized unsaturated triglyceride can also be described using a molecular weight or an average molecular weight of the side chains.

Curing Agent (vi)

The curing agent (vi) can be at least one of an isocyanate-containing compound (vii), blocked isocyanate-containing compound (viii) and aminoplast (ix).

(1) Isocyanate-containing Compound (vii)

The preferred curing agent (vi) is an isocyanate-containing compound (vii). In one embodiment, isocyanate-containing compound (vii) is a conventional substituted or unsubstituted aromatic, aliphatic, cycloaliphatic and/or heterocyclic polyisocyanate. Isocyanate-containing compound (vii) can have from 2 to 5 isocyanate groups per molecule. Exemplary isocyanates are described in "Methoden der organischen Chemie" [Methods of Organic Chemistry], Houben-Weyl, volume 14/2, 4th Edition, Georg Thieme Verlag, Stuttgart 1963, pages 61 to 70, and by W. Siefken, Liebigs Ann. Chem. 562, 75 to 136.

Suitable examples of isocyanate-containing compound (vii) include 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecane diisocyanate, omega,omega'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate ("isophorone diisocyanate"), 2,5- and 3,5-bis(isocyanatomethyl)-8-methyl-1,4-methano-decahydronaphthalene, 1,5-, 2,5-, 1,6- and 2,6-bis(isocyanatomethyl)-4,7-methanohexahydroindane, 1,5-, 2,5-, 1,6- and 2,6-bis(isocyanato)-4,7-methylhexahydroindane, dicyclohexyl2,4'- and 4,4'-diisocyanate, 2,4- and 2,6-hexahydrotolylene diisocyanate, perhydro 2,4'- and 4,4'-diphenylmethane diisocyanate, omega,omega'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanatodiphenylmethane, naphthylene-1,5-diisocyanate, tolylene diisocyanates, such as 2,4- and 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, 2,4,4'-triisocyanatodiphenyl ether and 4,4',4"-triisocyanatotriphenyl methane.

Isocyanate-containing compound (vii) can also contain one or more isocyanurate groups, biuret groups, allophanate groups, urethane groups and/or urea groups. Polyisocyanates containing urethane groups, for example, are obtained by reacting some of the isocyanate groups with polyols, for example trimethylol propane and glycerol.

Examples of preferred isocyanate-containing compounds (vii) are 2,4-toluene diisocyanate, 2,6-toluene diisocyanate, 4,4'-diphenylmethane diisoyanate, 2,4'-diphenylmethane diisocyanate, p-phenylene diisocyanate, biphenyl diisocyanates, 3,3'-dimethyl-4,4'-diphenylene diisocyanate, 1,4-tetramethylene diisocyanate, 1,6-hexamethylene diisocyanate, 1,6-diisocyanato-2,2,4-trimethylhexane, isophorone diisocyanate, ethylene diisocyanate, 1,12-dodecane diisocyanate, 1,3-cyclobutane diisocyanate, 1,3-cyclohexane diisocyanate, 1,4-cyclohexane diisocyanate, methylcyclohexyl diisocyanates, 2,4-hexahydrotoluene diisocyanate, 2,6-hexahydrotoluene diisocyanate, 1,3-hexahydrophenylene diisocyanate, 1,4-hexahydrophenylene diisocyanate, 2,4'-perhydrodiphenylmethane diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Further preferred isocyanate-containing compounds (vii) are the biuret dimers and the isocyanurate trimers of the aforementioned diisocyanates. Particularly preferred isocyanate-containing compounds (vii) are 1,6-hexamethylene diisocyanate (HDI), isophorone diisocyanate (IPDI) and 4,4'-methylenedicyclohexyl diisocyanate, their biuret dimers and/or isocyanurate trimers.

In one preferred embodiment, isocyanate-containing compound (vii) is obtained by prereacting at least one polyisocyanate, e.g., any of those listed above, with a secondary aminosilane. The equivalent ratio of isocyanate groups of the polyisocyanate reactant(s) to amino groups of the secondary aminosilane reactant(s) can generally range from 1.1:1.0 to 50.0:1.0, preferably from 2.0:1 to 10:1 and more preferably from 2.5:1.0 to 5.0:1.0. The resulting curing agent has at least one isocyanate group, at least one hydrolyzable silyl group and at least one ureido group. Suitable secondary aminosilanes used in the preparation of this embodiment of isocyanate-containing compound (vii) include N-methyl-3-aminopropyltrimethoxysilane, N-ethyl-3-aminopropyltrimethoxysilane, N-butyl-3-aminopropyltrimethoxysilane, N-ethyl-3-amino-2-methylpropyltrimethoxysilane, N-phenyl-3-aminopropyltrimethoxysilane, bis-[3-trimethoxysilylpropyl]amine, N-methyl-3-aminopropyltriethoxysilane, N-ethyl-3-aminopropyltriethoxysilane, N-butyl-3-aminopropyltriethoxysilane, N-ethyl-3-amino-2-methylpropyltriethoxysilane, N-phenyl-3-aminopropyltriethoxysilane, bis-[3-triethoxysilylpropyl]amine, etc., and their mixtures. Thus, e.g., isocyanate-containing compound (vii) is obtained by reacting HDI isocyanurate trimer and bis-[3-trimethoxysilylpropyl]amine at 1:0.99 to 1:0.01 equivalents.

(2) Blocked Isocyanate-Containing Compound (viii)

As previously indicated, curing agent (vi) can be at least one blocked isocyanate-containing compound (viii). Such compounds, as is known, can be obtained from the reaction of a polyisocyanate with a blocking agent such as an alcohol, phenol, oxime, beta-ketoester, malonate ester, and the like. Suitable polyisocyanate compounds are those described above in connection with isocyanato-containing compound (vii). Some suitable blocking agents include methanol, ethanol, isopropy alcohol, n-propanol, n-butyl alcohol, propan-2-one oxime, butan-2-one oxime, acetoacetone, dimethyl malonate and diethyl malonate.

(3) Aminoplast (ix)

In one embodiment, aminoplast (ix) representatives of curing agent (vi) are aminoplast resin compositions derived by reacting a polyamine or polyamide compound with an aldehyde, followed by a subsequent etherification reaction with an alcohol.

Polyamine compounds contain two or more amino groups, while polyamide compounds contain two or more amido groups. Such compounds can include triazines, diazines, triazoles, guanadines, guanamines, and alkyl- and aryl-substituted derivatives of these compounds, including alkyl- and aryl-substituted ureas, alkyl- and aryl-substituted melamines, and the like, or combinations thereof. For instance, suitable polyamine or polyamide compounds can comprise, consist essentially of, or consist of, melamine, urea, glycoluril, benzoguanamine, acetoguanamine, formoguanamine, spiroguanamine, N,N'-dimethyl urea, benzourea, dicyandiamide, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5 triazine, or combinations of two or more of these compounds.

Aminoplast (ix) can be derived from a polyamine compound. In one aspect, the polyamine compound can be a $C_1$-$C_{40}$ polyamine having at least two amine groups, wherein the amine groups are either a primary amine group, a secondary amine group, or a combination thereof. Alternatively, the polyamine compound can be a $C_1$-$C_{30}$ polyamine, a $C_1$-$C_{20}$ polyamine, a $C_1$-$C_{12}$ polyamine, or a $C_1$-$C_8$ polyamine. In another aspect, the polyamine compound can have the formula (VIII):

$$R^{14}(NR^{15}H)_m \qquad (VIII)$$

wherein $R^{14}$ is a $C_1$-$C_{20}$ organyl group or a $C_1$-$C_{20}$ hydrocarbyl group, and each occurrence of $R^{15}$ is independently a hydrogen or a $C_1$-$C_{20}$ hydrocarbyl group, and the subscript m is an integer of from least 2 to 15. In some aspects of this invention, $R^{14}$ can be a $C_1$-$C_8$ organyl group or a $C_1$-$C_8$ hydrocarbyl group, and $R^{15}$, in each occurrence, can be hydrogen or a $C_1$-$C_8$ hydrocarbyl group, and m can be equal to 2 or, alternatively, m can be equal to 3. In other aspects, $R^2$ can be H in each occurrence. The $C_1$-$C_{20}$ hydrocarbyl group or $C_1$-$C_8$ hydrocarbyl group employed as $R^{14}$ and $R^{15}$ can be any alkyl group, aryl group, or alkylaryl group. Alkyl groups include, but are not limited to, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, and the like. Aryl and arylalkyl groups include, but are not limited to, phenyl, alkyl-substituted phenyl, naphthyl, alkyl-substituted naphthyl, phenyl-substituted alkyl, naphthyl-substituted alkyl, and the like.

Unless otherwise specified, the disclosure of an alkyl group is intended to include all structural isomers, linear or branched, of a given moiety. Additionally, unless otherwise specified, the disclosure of an alkyl group is intended to include all enantiomers and all diastereomers. As examples, unless otherwise specified, the term propyl is meant to include n-propyl and iso-propyl, the term butyl is meant to include n-butyl, iso-butyl, t-butyl, sec-butyl, and the term octyl includes n-octyl, 2-ethylhexyl and neooctyl, among other isomers. Unless otherwise specified, any aryl group or arylalkyl group used herein includes all structural isomers (regioisomers, and linear or branched isomers), enantiomers, and diastereomers. For example, the term tolyl is meant to include any possible substituent position, that is, 2-methylphenyl, 3-methylphenyl, and/or 4-methylphenyl, and the term the term xylyl includes 2,3-dimethylphenyl, 2,4-dimethylphenyl, 2,5-dimethylphenyl, 2,6-dimethylphenyl, 3,4-dimethylphenyl, 3,5-dimethylphenyl, and 3,6-dimethylphenyl.

In an aspect, the alkyl, aryl, and alkyl aryl groups which can be employed as $R^{14}$ and $R^{15}$ independently can be methyl, ethyl, n-propyl, iso-propyl, n-butyl, iso-butyl, t-butyl, n-pentyl, neo-pentyl, phenyl, benzyl, tolyl, xylyl (dimethylphenyl), trimethylphenyl, phenylethyl, phenylpropyl, phenylbutyl, propyl-2-phenylethyl, or naphthyl. In an aspect, the alkyl groups which can be employed as $R^{14}$ and $R^{15}$ independently can be methyl, ethyl, n-propyl, iso-propyl, n-butyl, iso-butyl, t-butyl, n-pentyl, and neo-pentyl. In an aspect, the aryl or aryl alkyl groups which can be employed as $R^{14}$ and $R^{15}$ independently can be phenyl, benzyl, tolyl, xylyl (dimethylphenyl), trimethylphenyl, phenylethyl, phenylpropyl, phenylbutyl, and propyl-2-phenylethyl; alternatively, phenyl; alternatively, benzyl; alternatively, tolyl; or alternatively, xylyl.

The $C_1$-$C_{20}$ organyl group or $C_1$-$C_8$ organyl group employed as $R^{14}$ can be any functional group described herein that contains an atom other than hydrogen and carbon. For instance, the organyl group can comprise, consist essentially of, or consist of, a diazine, a triazine, or a triazole, any of which can be substituted with an alkyl group, aryl group, or alkylaryl group. Hence, $R^{15}$ can comprise, consist essentially of, or consist of, 1,3,5-triazine in one aspect of this invention, and in another aspect, $R^{14}$ can comprise, consist essentially of, or consist of, 2-phenyl-1,3,5-triazine.

Yet, in other aspects of this invention, the polyamine compound can comprise, consist essentially of, or consist of, melamine, guanamine, a substituted guanamine, or any combination thereof. For instance, the polyamine compound can comprise, consist essentially of, or consist of, melamine; alternatively, guanamine; or alternatively, a substituted guanamine, such as benzoguanamine. Moreover, the polyamine compound can comprise, consist essentially of, or consist of, a diazine, a triazine, or a triazole moiety in some aspects of this invention.

Aminoplast (ix) can be derived from a polyamide compound. In one aspect, the polyamide compound can be a $C_1$-$C_{40}$ polyamide having at least two amide groups, wherein at least one hydrogen atom is attached to each amide nitrogen atom. Hence, the amide nitrogen can have one hydrogen atom or two hydrogen atoms. In another aspect, the polyamide compound can be a $C_1$-$C_{30}$ polyamide, a $C_1$-$C_{20}$ polyamide, a $C_1$-$C_{12}$ polyamide, or a $C_1$-$C_8$ polyamide. In yet another aspect, the polyamide compound can have either the formula (IX) or (X):

$$CO(NR^{15}H)_2 \quad (IX); or$$

$$R^{14}(cO)(NR^{15}H)_m \quad (X)$$

wherein $R^{14}$ can be a $C_1$-$C_{20}$ organyl group or a $C_1$-$C_{20}$ hydrocarbyl group, and $R^{15}$, in each occurrence, can be hydrogen or a $C_1$-$C_{20}$ hydrocarbyl group, and m is at least 2. In some aspects, $R^{14}$ can be a $C_1$-$C_8$ organyl group or a $C_1$-$C_8$ hydrocarbyl group, and $R^{15}$, in each occurrence, can be hydrogen or a $C_1$-$C_8$ hydrocarbyl group, and m can be equal to 2 or, alternatively, m can be equal to 3. In other aspects, $R^{14}$ can be hydrogen in each occurrence.

Suitable organyl and hydrocarbyl selections for $R^{14}$ and hydrocarbyl selections for $R^{15}$ for the polyamide compound can be as described above for the polyamine compound. For instance, representative alkyl, aryl, and alkyl aryl selections for $R^{14}$ and $R^{15}$ independently can be methyl, ethyl, n-propyl, iso-propyl, n-butyl, iso-butyl, t-butyl, n-pentyl, neo-pentyl, phenyl, benzyl, tolyl, xylyl (dimethylphenyl), trimethylphenyl, phenylethyl, phenylpropyl, phenylbutyl, propyl-2-phenylethyl, or naphthyl.

Yet, in other aspects disclosed herein, the polyamide compound can comprise, consist essentially of, or consist of, urea, glycoluril, or a combination thereof. For instance, the polyamide compound can comprise, consist essentially of, or consist of, urea; or alternatively, glycoluril.

In the preparation of aminoplast resin compositions, the first step generally is the reaction of a polyamine or polyamide compound with an aldehyde. This reaction is often referred to as an alkylolation (or a methylolation, in the case of formaldehyde). A single aldehyde, or a mixture or combination of two or more aldehydes, can be used in this reaction. In one aspect of the present invention, the aldehyde can be a $C_1$-$C_{18}$ aldehyde. In another aspect, the aldehyde can be $C_1$-$C_{10}$ aldehyde. For instance, the aldehyde can comprise, consist essentially of, or consist of, formaldehyde, acetaldehyde, propionaldehyde, n-butyraldehyde, isobutyraldehyde, valeraldehyde, hexanaldehyde, octylaldehyde, crotonaldehyde, acrolein, benzaldehyde, furfural, glyoxal, glutaraldehyde, and the like, or combinations thereof. In yet another aspect, the aldehyde can comprise, consist essentially of, or consist of, formaldehyde; alternatively, acetaldehyde; or alternatively, benzaldehyde.

Depending upon the ratio of polyamine/polyamide to aldehyde, mixtures of partially alkylolated derivatives can result. The molar ratio of amino/amido groups (e.g., primary and secondary) in the polyamine/polyamide compound to aldehyde groups in the aldehyde typically falls within a range from 1:10 to 50:1, from 1:2 to 25:1, or from 1:1 to 10:1. Alkylolated derivatives, which can be used to synthesize aminoplast (ix), can have the formula (XI):

$$R^{14}(NR^{16}R^{17})_m \quad (XI)$$

wherein $R^{14}$ is a $C_1$-$C_{20}$ organyl group or a $C_1$-$C_{20}$ hydrocarbyl group, and each occurrence of $R^{16}$ and $R^{17}$ is independently —H, —CH$_2$OH, or —CH$_2$OR$^{14}$, and m is at least 2. For instance, m can be equal to 2 or, alternatively, n can be equal to 3. In each occurrence, $R^{16}$ can be a $C_1$-$C_{10}$ hydrocarbyl group. Alternatively, in each occurrence, $R^{16}$ can be a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl. In some aspects of this invention, $R^{14}$ can be a $C_1$-$C_{12}$ organyl group or a $C_1$-$C_{12}$ hydrocarbyl group, while in other aspects, $R^{14}$ can be a $C_1$-$C_8$ organyl group or a $C_1$-$C_8$ hydrocarbyl group.

In the preparation of aminoplast resin compositions, the second step generally is an etherification reaction with an alcohol. This reaction, based on the ratio of the alkylolated reaction product to the alcohol can result in complete or partial etherification. Oligomeric species—dimers, trimers, higher oligomers, and so forth—also can result from the preparation of an aminoplast resin composition, and such oligomeric products are also encompassed herein. Often, the alcohol employed is a monohydric alcohol. Suitable alcohols can include, but are not limited to, methanol, ethanol, propanol, isopropanol, n-butanol, isobutanol, pentanol, hexanol, heptanol, octanol, and the like, as well as benzyl alcohol, phenol, and other aromatic alcohols, cyclic alcohols such as cyclohexanol, monoethers of glycols, and halogen-substituted or other substituted alcohols, such as 3-chloropropanol and butoxyethanol. More than one alcohol can be used and, therefore, mixtures or combinations of alcohols are contemplated. For instance, mixtures of methanol/n-butanol, methanol/isobutanol, methanol/ethanol, methanol/isooctanol, and the like, can be employed. Any ratio of the respective alcohols can be used, but typically, the molar ratio is in a range of 10:1 to 1:10, for example, from 6:1 to 1:6, or from 3:1 to 1:3.

In the present invention, the alcohol used in the preparation of the aminoplast (ix) can comprise (or consist essentially of, or consist of) methanol. In another aspect, the alcohol can comprise (or consist essentially of, or consist of) ethanol. In still another aspect, the alcohol can comprise (or consist essentially of or consist of) butanol (e.g., n-butanol, isobutanol, etc.). In yet another aspect, the alcohol can comprise (or consist essentially of, or consist of) benzyl alcohol.

In one embodiment of this invention, aminoplast (ix) can comprise, consist essentially of, or consist of, molecules having the formula (XII)-(XIV):

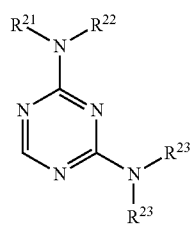

(XII)

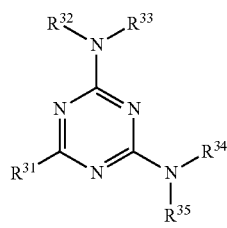

(XIII)

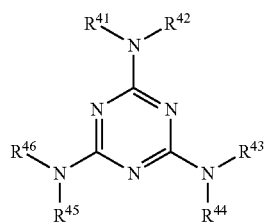

(XIV)

wherein each occurrence of $R^{21}$, $R^{22}$, $R^{23}$, $R^{32}$, $R^{33}$, $R^{34}$, $R^{35}$, $R^{41}$, $R^{42}$, $R^{43}$, $R^{44}$, $R^{45}$, and $R^{46}$ is independently —H, —CH$_2$OH, or CH$_2$OR$^{14}$, wherein each occurrence of $R^{18}$ is a $C_1$-$C_{10}$ hydrocarbyl group, and $R^{31}$ is a methyl group or a phenyl group. In some aspects, the alkyl, aryl, and alkyl aryl groups which can be employed as $R^{18}$ independently can be methyl, ethyl, n-propyl, iso-propyl, n-butyl, t-butyl, n-pentyl, neo-pentyl, n-hexyl, n-heptyl, n-octyl, 2-ethyl hexyl, phenyl, benzyl, tolyl, xylyl (dimethylphenyl), trimethylphenyl, phenylethyl, phenylpropyl, naphthyl, and the like. In some aspects of this invention, $R^{21}$, $R^{22}$ and $R^{23}$ independently can be —H, —CH$_2$OH, or CH$_2$OR$^{18}$, wherein each occurrence of $R^{18}$ is independently methyl, ethyl, n-propyl, iso-propyl, n-butyl, t-butyl, or iso-butyl. In other aspects of this invention, $R^{31}$ can be a methyl group or a phenyl group, and each occurrence of $R^{32}$, $R^{33}$, $R^{34}$ and $R^{35}$ is independently —H, —CH$_2$OH, or —CH$_2$OR$^{18}$, wherein each occurrence of $R^{18}$ is $C_1$-$C_{10}$ hydrocarbyl group; alternatively, a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl. Furthermore, in other aspects, each occurrence of $R^{41}$, $R^{42}$, $R^{43}$, $R^{44}$, $R^{45}$, and $R^{46}$ is independently —H, —CH$_2$OH, or —CH$_2$OR$^{18}$, wherein each occurrence of $R^{18}$ is independently a $C_1$-$C_{10}$ hydrocarbyl group; alternatively, a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl.

In these formulas, $R^{21}$, $R^{22}$, $R^{23}$, $R^{32}$, $R^{33}$, $R^{34}$, $R^{35}$, $R^{41}$, $R^{42}$, $R^{43}$, $R^{44}$, $R^{45}$, and $R^{46}$ independently can be —H, —CH$_2$OH, or CH$_2$OR$^{18}$, wherein $R^{18}$, in each occurrence, can be a $C_1$-$C_{10}$ hydrocarbyl group, and $R^{31}$ can be a methyl group or a phenyl group. In some aspects, the alkyl, aryl, and alkyl aryl groups which can be employed as $R^{18}$ independently can be methyl, ethyl, n-propyl, iso-propyl, n-butyl, t-butyl, n-pentyl, neo-pentyl, n-hexyl, n-heptyl, n-octyl, 2-ethyl hexyl, phenyl, benzyl, tolyl, xylyl (dimethylphenyl), trimethylphenyl, phenylethyl, phenylpropyl, naphthyl, and the like. For instance, $R^{18}$, in each occurrence, can be methyl, ethyl, n-propyl, iso-propyl, n-butyl, t-butyl, n-pentyl, neo-pentyl, n-hexyl, n-heptyl, n-octyl, or 2-ethyl hexyl; alternatively, $R^{18}$, in each occurrence, can be phenyl, benzyl, tolyl, xylyl (dimethylphenyl), trimethylphenyl, phenylethyl, phenylpropyl, or naphthyl; alternatively, $R^{18}$, in each occurrence, can be methyl, ethyl, n-propyl, iso-propyl, n-butyl, or t-butyl; alternatively, $R^{18}$, in each occurrence, can be methyl or n-butyl; or alternatively, $R^{18}$, in each occurrence, can be phenyl, benzyl, tolyl, or xylyl. In some aspects of this invention, $R^{21}$, $R^{22}$, $R^{23}$ and $R^{24}$ independently can be —H, —CH$_2$OH, or —CH$_2$OR$^{18}$, wherein $R^{18}$, in each occurrence, can be a $C_1$-$C_{10}$ hydrocarbyl group; alternatively, a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl. In other aspects of this invention, $R^{31}$ can be a methyl group or a phenyl group, and $R^{32}$, $R^{33}$, $R^{34}$ and $R^{35}$ independently can be —H, —CH$_2$OH, or —CH$_2$OR$^{18}$, wherein $R^{18}$, in each occurrence, can be a $C_1$-$C_{10}$ hydrocarbyl group; alternatively, a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl. Furthermore, in other aspects, $R^{41}$, $R^{42}$, $R^{43}$, $R^{44}$, $R^{45}$, and $R^{46}$ independently can be —H, —CH$_2$OH, or —CH$_2$OR$^{18}$, wherein $R^{18}$, in each occurrence, can be a $C_1$-$C_{10}$ hydrocarbyl group; alternatively, a $C_1$-$C_8$ hydrocarbyl group; alternatively, a $C_1$-$C_6$ hydrocarbyl group; alternatively, methyl, ethyl, n-propyl, iso-propyl, n-butyl, t-butyl, or iso-butyl; or alternatively, methyl or butyl.

In accordance with another aspect of this invention, aminoplast (ix) can comprise molecules having the formulae (XV) or (XVI):

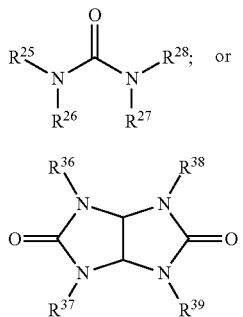

In these formulas, each occurrence of $R^{25}$, $R^{26}$, $R^{27}$, $R^{28}$, $R^{36}$, $R^{37}$, $R^{38}$, and $R^{39}$ is independently —H, —CH$_2$OH, or —CH$_2$OR$^{18}$, wherein each occurrence of R$^{18}$ is be a C$_1$-C$_{10}$ hydrocarbyl group. In some aspects of this invention, $R^{25}$, $R^{26}$, $R^{27}$ and $R^{28}$ independently can be —H, —CH$_2$OH, or —CH$_2$OR$^{18}$, wherein each occurrence of R$^{18}$ is independently a C$_1$-C$_8$ hydrocarbyl group; alternatively, a C$_1$-C$_6$ hydrocarbyl group; alternatively, methyl, ethyl, n-propyl, iso-propyl, n-butyl, t-butyl, or iso-butyl; or alternatively, methyl or butyl. In other aspects of this invention, each occurrence of $R^{36}$, $R^{37}$, $R^{38}$ and $R^{39}$ is independently —H, —CH$_2$OH, or —CH$_2$OR$^{18}$, wherein each occurrence of R$^{18}$ is independently a C$_1$-C$_8$ hydrocarbyl group; alternatively, a C$_1$-C$_6$ hydrocarbyl group; alternatively, methyl, ethyl, n-propyl, iso-propyl, n-butyl, t-butyl, or iso-butyl; or alternatively, methyl or butyl.

Representative aminoplast (ix) that can be employed in the present invention include those materials commercially available under the RESIMENE®, CYMEL®, Luwipal®, and Plastopal® tradenames. Specific non-limiting examples include RESIMENE® 747 (methylated melamine-formaldehyde resin) and 755 (methylated-butylated melamine-formaldehyde resin); and CYMEL® 1123 (methylated-ethylated benzoguanamine-formaldehyde resin), 1170 (butylated glycoluril-formaldehyde resin), U-60 (methylated urea-formaldehyde resin), and U-80 (butylated urea-formaldehyde resin). Aminoplast (ix) of this invention can comprise, for instance, partially methylated melamines, partially butylated melamines, hexaethoxymethylmelamine, hexamethoxymethylmelamine, dimethoxytetraethoxymethylmelamine, dibutoxytetramethoxymethylmelamine, butylated benzoguanamine, partially methylated urea, fully methylated urea, fully butylated urea, hexabutoxymethylmelamine, tetrabutoxymethylglycoluril, dimethoxymethyl-diethoxymethylglycoluril, and mixtures thereof.

Curing agent (vi) is generally used in amount of from 0.5 to 5 equivalents, based upon the active hydrogen content of active hydrogen-containing resin (ii), more specifically of from 1.0 to 3 equivalent and even more specifically of from 1.1 to 1.6 equivalents. The active hydrogen contain can be determined from the OH number on the polyols (iii), the N—H contain of the amine-functional resin (iv), or the SH number on the mercapto-functional resin (v).

Flexibilizer-reactive Component (x)

In one embodiment, flexibilizer-reactive component (x) is at least one member selected from the group consisting of filler, resin containing silanol-reacting group and resin containing alkoxy-reacting group.

In one embodiment, the filler is at least one member selected from the group consisting of particulate metal, fumed metal oxide, precipitated metal oxide, precipitated and ground metal carbonate and carbon black, metal sulfate, metal phosphate, silicate, and having a concentration in the range of from 0 to 50 weight percent based on the total weight of composition.

The use of any and all examples, or exemplary language provided herein, for example, "such as," is intended merely to better illuminate the present teachings and does not pose a limitation on the scope of the invention unless claimed. No language in the specification should be construed as indicating any non-claimed element as essential to the practice of the present teachings.

Optional Components (xi)

Optional components can be incorporated in the compositions of the invention in known and conventional amounts. Optional components (xi) include catalysts, organic and inorganic compounds that contribute to the processing, flexibility and/or curing of the compositions and/or their cured properties. Optional components include catalyst, organic solvent, polysiloxane resin other than Formula (I), isocyanate-reactive scavenging agent, water scavenger agent, desiccant, non-silicon-based epoxy hardener, surfactant, colorant, rheology modifier, plasticizer, extender, filler, reinforcing agent, adhesion promoter, organic resin modifier, UV stabilizer, wetting agent, flow and leveling additive, thixotrope, defoamer, and the like. Several of the optional components are more fully described below.

(1) Catalyst

Catalysts include metal-containing and non-metal-containing catalysts. Examples of catalyst include tin, titanium, zirconium, lead, iron cobalt, antimony, manganese, bismuth and zinc compounds. Other suitable non-limiting examples of catalyst are well known in the art and include chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Al, Be, Mg, Zn, Cd, Pb, Ti, Zr, Sn, As, Bi, Cr, Mo, Mn, Fe, Co, Ni, and metal oxide ions as MoO$^{2++}$, UO$^{2++}$ and the like; alcoholates and phenolates of various metals such as Ti(OR$^{47}$)$_4$, Sn(OR$^{47}$)$_4$, Sn(OR$^{47}$)$_2$, Al(OR$^{47}$)$_3$, Bi(OR$^{47}$)$_3$ and the like, wherein R$^{47}$ is alkyl or aryl group of from 1 to 18 carbon atoms, and reaction products of alcoholates of various metals with carboxylic acids, beta-diketones, and 2-(N,N-dialkylamino)alkanols, such as well known chelates of titanium.

Additional useful catalysts include organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltindilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof.

The amount of catalyst that generally employed in the compositions can be from 0.0011 to 10 parts by weight per one hundred parts of active hydrogen-containing resin (ii), and more specifically, from 0.1 to 0.15 parts by weight per one hundred parts of active hydrogen-containing resin (ii).

(2) Solvent

Organic solvents are used to lower the viscosity and improve the flow properties of the uncured composition, which are especially useful when the composition is used as a coating. A variety of solvents may be mentioned as exemplary, for example, alcohols, glycols, triols, polyols, glycol ethers, esters, ketones, hydrocarbon, and the like.

Representative and non-limiting examples of specific solvents include mono-alcohols, such as methanol, ethanol, 1-propanol, 2-propanol (i-propanol), 2-methyl-1-propanol (i-butanol), 2-methyl-2-propanol (tert-butanol), 1-butanol, 2-butanol, 2-methyl-1 butanol, 2-methyl-2-butanol, 2,2-dimethyl-1-propanol, 1-pentanol, 2-pentanol, 4-methyl-2-pentanol; glycols such are propylene glycol, 1,3-butanediol, 1,4-butane diol, 2-methyl-1,3-propanediol, 2-methyl-2,4-pentanediol (hexylene glycol), diethylene glycol, triethylene glycol, tetraethylene glycol, poly(ethylene glycol), dipropylene glycol, tripropylene glycol, poly(propylene glycol), 1,5-pentanediol, esterdiol 204, 2,2,4-trimethylpentanediol, 2-ethyl-1,3-hexanediol, glycerol, glycerol ethoxylate, glycerol ethoxylate-co-propoxylate triol, glycerol propoxylate, pentaerythritol; glycol ethers such as 1-methoxy-2-propanol (propylene glycol methyl ether), 1-ethoxy-2-propanol, 1-propoxy-2-propanol, 1-butoxy-2-propanol, 2-methoxyethanol, 2-ethoxyethanol, 2-propoxyethanol, 2-butoxyethanol, 2-(2-methoxyethoxy)ethanol, 2-(2-ethoxyethoxy)ethanol, 2-(2-propoxyethoxy)ethanol, 2-(2-butoxyethoxy) ethanol (butyl carbitol), di(propylene glycol) butyl ether, tri(ethylene glycol) monomethyl ether, tri(ethylene glycol) monoethyl ether, tri(ethylene glycol) monobutyl ether, poly (ethylene glycol) methyl ether, poly(ethylene glycol) dimethylether, poly(ethylene glycol-co-propylene glycol), poly (ethylene glycol-co-propylene glycol) monobutyl ether, poly (propylene glycol) monobutyl ether, di(propylene glycol) dimethylether; esters including methyl acetate, ethyl acetate, ethyl lactate, 2-methoxyethyl acetate, 2-ethoxyethyl acetate, 2-butoxyethyl acetate, 2-(2-methoxyethoxy)ethyl acetate, 2-(2-ethoxyethoxy)ethyl acetate, 2-(2-butoxyethoxy)ethyl acetate, glycol diacetate, triethylene glycol diacetate, propylene glycol methyl ether acetate (1-methoxy-2-propanol acetate), propylene glycol ethyl ether acetate, ketones including acetone, methyl ethyl ketone, 2,4-pentane dione, diacetone alcohol and hydrocarbons including toluene, xylene, naptha, mineral spirits, hexane, heptane, cyclohexane and mixtures thereof.

In certain embodiments, the solvent can be present in the composition of the invention in an amount ranging from 1 to 80 percent by weight, advantageously from 10 to 30 percent by weight, and in some embodiments, from 10 to 25 percent by weight, based on the total weight of the composition.

(3) Surfactant

Surfactants may be used to aid in the wetting and leveling of the composition of the invention especially where the composition is used as a coating. Useful surfactants include nonionic, cationic, anionic, amphoteric and/or zwitterionic surfactants. The surfactants are typically hydrocarbon-based, silicone-based or fluorocarbon-based. Useful surfactants having short chain hydrophobes are described in U.S. Pat. No. 5,558,806 the entire contents of which are incorporated by reference herein. Other useful surfactants include alkoxylates, especially ethoxylates, containing block copolymers including copolymers of ethylene oxide, propylene oxide, butylene oxide, and mixtures thereof; alkylarylalkoxylates, especially ethoxylates or propoxylates and their derivatives including alkyl phenol ethoxylate; arylarylalkoxylates, especially ethoxylates or propoxylates, and their derivatives; amine alkoxylates, especially amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; and mixtures thereof.

Representative, non-limiting examples of surfactants include alkyl acetylenic diols sold by Air Products under the trade name SURFONYL®, pyrrilodone-based surfactants sold by ISP under the trade name SURFADONE-LP® 100, 2-ethyl hexyl sulfate, isodecyl alcohol ethoxylates sold by Rhodia under the trade name RHODASURF® DA 530, ethylene diamine alkoxylates sold by BASF under the trade name TETRONICS®, ethylene oxide/propylene oxide copolymers sold by BASF under the trade name PLURONICS®, and diphenyl ether Gemini type surfactants sold by Dow Chemical Corporation under the trade name DOW-FAX®.

In general, the compositions herein can contain the optional surfactant(s) in an amount of from 0.01 to 5 weight percent, advantageously from 0.05 to 2 weight percent and in certain embodiments, from 0.1 to 1 weight percent based on the total weight of the composition.

(4) Colorant

The composition of the invention can include a colorant. As used herein, the term "colorant" means any substance that imparts color and/or other opacity and/or other visual effect to the composition. The colorant can be added to the composition in any suitable form such as discrete particles, dispersions, solutions, flakes, etc. A single colorant or a mixture of two or more colorants can be used in the composition of the invention.

Useful colorants include pigments, dyes and tints such as those used in the paint industry and/or listed in the Dry Color Manufacturers Association (DCMA), as well as special-effect materials. A useful type of colorant can be a finely divided solid powder that is insoluble but wettable under the conditions of use. A colorant can be organic or inorganic and can be agglomerated or non-agglomerated. Colorants can be incorporated into the compositions by use of a grinding vehicle such as an acrylic grinding vehicle the use of which is familiar to those skilled in the art.

Illustrative useful pigments and pigment compositions include, but are not limited to, carbazole dioxazine crude pigment, azo dyes, naphthol AS, benzimidazolone, metal complexes, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Useful dyes include, but are not limited to, those that are solvent and/or aqueous based such as phthalo green or blue, iron oxide, bismuth vanadate, anthraquinone, perylene, aluminum and quinacridone.

Useful tints include, but are not limited to, pigments dispersed in water-based or water miscible carriers such as AQUA-CHEM® 896 commercially available from Degussa, Inc., CHARISMA COLORANTS® and MAX- ITONER INDUSTRIAL COLORANTS® commercially available from Accurate Dispersions division of Eastman Chemical, Inc.

In general, the colorant can be present in the composition in any amount that is sufficient to impart the desired visual and/or color effect. The colorant can comprise from, for example, 1 to 65 weight percent of the composition, such as from 3 to 40 weight percent or 5 to 35 weight percent thereof based on the total weight of the composition.

(5) Filler

The composition of the invention can include a filler. The filler of the composition can be any inorganic or organic filler that reinforces and/or extends the composition. Useful fillers include, for example, reinforcing fillers such as carbon black, fumed silica, precipitated silica, clays, talc, aluminum silicates, particulate metal, metal sulfates, metal phosphates, silicates, metal oxides and hydroxides, and extending fillers such as treated and untreated calcium carbonates, and the like. Fillers can be in the form of powders, particulates, aggregates, agglomerates, platelets, fibers, etc. In one embodiment, one or more fillers are combined with silane coupling agents.

To further improve the physical strength of the cured compositions herein, reinforcing carbon black can be used as a main filler resulting in a black or darkly colored composition. Several commercial grades of carbon black useful in this invention are commercially available such as the Corax® products from Degussa. To obtain colorless translucent compositions, higher levels of fumed silica or precipitated silica can be used as the main filler to the exclusion of carbon black. The surface area of the filler can be more than 20 $m^2/g$.

Treated calcium carbonates having particle sizes from 0.07 microns to 4 microns are preferred fillers and are available under several trade names, such as: "Ultra Pflex®" and "Hi Pflex®" from Specialty Minerals; "Winnofil® SPM" and "Winnofil® SPT" from Zeneca Resins; "Hubercarb® 1 Qt", "Hubercarb® 3Qt" and "Hubercarb® W" from Huber and "Kotomite®" from ECC. These fillers can be used either alone or in combination.

The optional fillers can be incorporated in the composition in an amount of up to 80 weight percent, advantageously in an amount of up to 50 weight percent, and in certain embodiments, in an amount of from 20 weight percent to 50 weight percent based on the total weight of the composition.

(6) Plasticizer

The compositions herein can optionally include plasticizers. Exemplary plasticizers include phthalates, dipropylene and diethylene glycol dibenzoates and mixtures thereof, epoxidized soybean oil, and the like. Useful commercial dioctyl and diisodecyl phthalates include "Jayflex® DOP" and "Jayflex® DIDP" from Exxon Chemical. Dibenzoate plasticizers are available as "Benzoflex® 9-88", "Benzoflex® 50" and "Benzoflex® 400" from Velsicol Chemical Corporation. The optional plasticizer can represent up to 100 parts by weight per hundred parts of ioscyanate-reactive resin (i) with up to 40 parts by weight per hundred being preferred.

(7) Thixotrope

Useful optional thixotropes include various castor waxes, fumed silica, treated clays and polyamides. Commercially available thixotropes include, for example, Aerosil from Degussa, Cabo-Sil TS 720 from Cabot, Castorwax from CasChem, Thixatrol and Thixcin from Rheox, Crayvallac from Crayvalley Corp. and Dislon from King Industries.

(8) Isocyanate-Reactive Scavenging Agent

The optional isocyanate-reactive scavenging agent is an agent possessing at least one active hydrogen and that reacts with isocyanate at a rate greater than that of undesired reactions that cause an increase in viscosity such as the further reaction of isocyanate with hydroxyl-terminated polymers (if there is still hydroxyl present), reaction of isocyanate with urethane to form allophanate, reaction of isocyanate with urea to form biuret and reaction of the hydroxyl-terminated polymers with an alkoxysilyl group.

The isocyanate-reactive scavenging agent can be added to the reaction mixture of isocyanate-containing compound (vii), hydroxyl-terminated polymer and optionally other ingredients, such as catalysts and non-protic solvents, at a desired point at or near the end of the silylation reaction. It is understood that for di- or polyisocyanate-extended polyols the hydroxyl-terminated polymer may contain residual isocyanate, either from partially reacted di- or polyisocyanate, or from unreacted di- or polyisocyanate. The residual isocyanate present in the silylated polyurethane resin can come from the di- or polyisocyanate used to chain extend the polyol, or from the isocyanatosilane used to react with the hydroxyl-terminated polymer. The desired point for the addition of the isocyanate-reactive agent can be determined by the viscosity of the reaction mixture, or by some other method. Thus, the isocyanate-reactive scavenging agent is added to the reaction mixture at a particular viscosity depending on formulation and the desired properties of the final product. In one embodiment of the invention, the isocyanate-reactive scavenging agent is added to the reaction mixture at a viscosity range from 1,000 cP to 150,000 cP (measured at a temperature of 25° C.), and in another embodiment of the invention from 30,000 cP to 75,000 cP (measured at a temperature of 25° C.). In this manner, the isocyanate-reactive scavenging agent minimizes batch-to-batch variation of the final viscosity of the silylated polyurethane resin.

The isocyanate-reactive scavenging agent is allowed to react with the isocyanate-containing reaction mixture for sufficient time to ensure that all of the residual isocyanate has reacted. The isocyanate-reactive scavenging agent can be added in a stoichiometric amount relative to the residual isocyanate, but it is preferable to add an excess of the isocyanate-reactive scavenging agent to ensure that all of the residual isocyanate is reacted and to inhibit the reaction of the residual hydroxyl groups of the hydroxyl-terminated polymer with the alkoxysilyl groups. In one embodiment of the invention, the amount of isocyanate-reactive scavenging agent added to the isocyanate-containing reaction mixture is from 0.01 to 5 weight percent based upon the weight of active hydrogen-containing resin (ii), and from 0.01 to 0.5 weight percent based upon the weight of active hydrogen-containing resin (ii) in another embodiment of the invention, and in still another embodiment from 0.02 to 0.2 weight percent based upon the weight of active hydrogen-containing resin (ii).

According to one embodiment of the invention, active hydrogen-containing resin (ii) is mixed with the isocyanate-containing compound (vii) containing less than 60 weight percent isocyanate (measured as % NCO), and in another embodiment of the invention reaction mixture of active hydrogen-containing resin (ii) and isocyanate-containing compound (vii) is further reacted with the isocyanate-reactive scavenging agent to reduced isocyanate content to less than 3 weight percent isocyanate (measured as % NCO), more specifically less than 0.5 weight percent isocyanate, and even more specifically, less than 0.01 weight percent isocyanate.

The isocyanate-reactive scavenging agent can be added neat or as a mixture with one or more other materials. The disappearance of the isocyanate can be determined directly by analytical techniques such as infra-red spectroscopy and titration, or indirectly by the measurement of constant viscosity of the reaction mixture. The synthesis can be monitored using titration (ASTM 2572-87) or infrared analysis.

According to one embodiment of the invention, the isocyanate-scavenging agent is a mono-alcohol or a mixture of different mono-alcohols, secondary amine or mercaptan.

Mono-alcohols are generally preferred in that they have low odor, do not contribute to the color of the silylated polyurethane resin and inhibit the reaction of residual hydroxyl-terminated polymer with alkoxysilyl groups. Other active hydrogen compounds such as amines and organic acids typically have strong odors, can impact color and can catalyze the reaction of the residual hydroxyl-terminated polymer with alkoxysilyl groups.

In one embodiment of the invention, the selected isocyanate-reactive scavenging agent is one that has little or no effect on the physical or cure properties of the resin or on the properties of a cured material, for example, coating, sealant, adhesive, etc., made from the composition.

The monoalkanol isocyanate-reactive scavenging agent possesses the general formula: $R^{48}$—OH in which $R^{48}$ is a monovalent hydrocarbon group containing from 1 to 30 carbon atoms and optionally may contain a heteroatom. The heteroatom can, for example, be oxygen, which can form organofunctional groups, such as ethers, ester, and ketone groups. In another embodiment, the hydrocarbon group is selected from the group consisting of linear, branched and cyclic alkyl, and alkenyl, aryl, arenyl and aralkyl.

Representative non-limiting examples of $R^{48}$ include alkyl, such as methyl, ethyl, propyl, isopropyl, butyl, pentyl, dodecyl, cyclohexyl, cyclopentyl, and 3-methylhexyl; alkenyl, such as vinyl, allyl and methallyl; aryl, such as phenyl; arenyl, such as 4-methylphenyl, 2,4-dimethylphenyl and 2,4,6-trimethylphenyl; and aralkyl, such as benzyl and 2-phenylethyl.

In another embodiment of the invention, the mono-alcohols have the hydroxyl group attached to a primary carbon. A primary carbon is one in which at least two hydrogen atoms are attached to the carbon, —$CH_2OH$. The mono-alcohol scavenging agents of the invention are more reactive with the isocyanate group because they are less sterically hindered.

According to one embodiment of the invention, useful mono-alcohols as isocyanate-reactive scavenging agents include methanol, ethanol, n-propanol, isopropanol, n-butanol, sec-butanol, tert-butanol, hexanol, cyclohexanol and the like, and mixtures thereof In a specific embodiment of the invention, when the terminal alkoxysilyl group of active hydrogen-containing resin (ii) is a methoxysilyl, the specific isocyanate-reactive scavenging agent is methanol. In another specific embodiment of the invention, when the terminal alkoxysilyl group of active hydrogen-containing resin (ii) is an ethoxysilyl, the specific isocyanate-reactive scavenging agent is ethanol.

In one embodiment of the invention, the reaction mixture of active hydrogen-containing resin (ii) and isocyanate-containing compound (vii) has a reduced isocyanate content resulting from the addition of isocyanate-scavenging agent as disclosed herein, following aging, exhibits a viscosity of 1,000 cP to 150,000 cP, more specifically from 30,000 cP to 75,000 cP and most specifically from 35,000 cP to 65,000 cP.

(9) Antioxidant

Optional antioxidants that can be added to the composition of the invention to provide protection against oxidative change. The quantities in which antioxidants can be used vary within wide limits, for example, from 0.01 to 10 percent by weight and, more particularly, from 0.01 to 3 percent by weight, based on the weight of active hydrogen-containing resin (ii).

(10) Adhesion Promoter

The composition of the invention can optionally include an adhesion promoter. Thus, for example, the adhesion promoter can be a compound of the general formula (XVII):

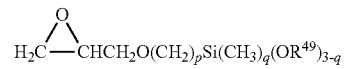

(XVII)

wherein each occurrence of $R^{49}$ is independently methyl, ethyl, propyl, isopropyl, q is 0, 1 or 2 and p is 2 to 6, preferably 3.

Preferred, non-limiting examples of adhesion promoters include trimethoxy-(3-oxiranylmethoxy-propyl)-silane and dimethoxy-methyl-(3-oxiranylmethoxy-propyl)-silane.

(11) Water Scavenger Agent

Water scavenger agent can optionally be added to the composition herein to improve its package stability and to prevent premature curing. It will be understood herein that any known or commercially used water scavenger agent can be employed herein. One type of water scavenger agent can be an alkoxysilane, for example, vinyltrimethoxysilane, methyltrimethoxysilane, and the like. The concentration of water scavenger agent can be in the range of from 0 to 5 percent by weight based on the weight of active hydrogen-containing resin (ii).

In an alternative to or in addition to optional water scavenging agent, desiccant can optionally be added to the composition herein to improve its package stability and to prevent premature curing. Any known or conventional desiccant, for example, silica gel, can be employed herein for such purposes.

As will be appreciated from the foregoing disclosure, the compositions of the invention can be prepared by combining flexibilizer (i) of Formula OD, active hydrogen-containing resin (ii), and curing agent (vi), as well as one or more of the previously described optional components, among others. The combination can be achieved by the use of static mixers or mechanical mixers.

When used as a coating, the composition of this invention can be applied to a desired substrate surface to protect it from weathering, impact, and exposure to corrosion and/or chemicals. Illustrative of substrates that can be treated using compositions of this invention include wood, plastic, concrete, vitreous surfaces, and metallic surfaces. The coating compositions of this invention are useful, for example, as a top coating disposed either directly onto the substrate surface itself or disposed onto a prior or other underlying coating, as for example, an inorganic or organic primer material, disposed on the substrate surface to achieve a desired purpose.

The coating compositions of this invention can be applied to a surface to be treated by conventional coating techniques such as, for example, dip coating, direct roll coating, reverse roll coating, curtain coating, spray coating, brush coating, and combinations thereof The curing of the composition begins when flexibilizer (i), active hydrogen-containing resin (ii), curing agent (vi)

and optional components are mixed together. The curing can be accelerated by using a catalyst. The curing can occur at room temperature. However, the curing rate will increase if the composition is heated to temperatures of from 30° C. to 200° C., more specifically of from 70° C. to 140° C.

When active hydrogen-containing resin (ii) also contains an alkoxysilyl group, the composition has a dual cure, where the alkoxysilyl groups cure by exposure to moisture (water) at temperatures ranging from −10° C. to 200° C. at sub-atmospheric, atmospheric or supra-atmospheric pressures. Generally, moisture content in the air of from 15 to 100 percent relative humidity and more advantageously from 30 to 90 percent relative humidity provides acceptable cure times.

The cured resin composition of the invention is highly suitable for application as an adhesive, for example, a windshield adhesive, sealant, coating, gasket, addition to industrial rubber good, and the like.

Various features of the invention are illustrated by the examples presented below.

EXAMPLES

Preparation of Flexibilizer (I) is Described below.

Water (600 g) was heated to 85° C. in a 2 L, 3-necked flask equipped with a reflex condenser, stirrer, addition funnel and a heating mantle. With the stirrer running, a pre-mixed solution of 150 g $Me_2SiCl_2$, 50 g $Ph_2SiCl_2$ and 90 g toluene was slowly added to the flask. The temperature of the reaction mixture in the flask was maintained between 75 and 90° C. during addition. The reaction mixture was heated and mixed for an additional hour at 85° C. Stirring was then discontinued and the reaction mixture allowed to phase separate. The aqueous phase was drained, and 200 g of water were added to the organic phase which was then heated to 85° C. with stirring. The reaction mixture was heated and mixed for an additional hour at 85° C. Stirring was then discontinued and the reaction mixture allowed to phase separate. The aqueous phase was drained, and another 200 g of water were added to the organic phase which was then heated to 85° C. with stirring. The reaction mixture was heated and mixed for an additional hour at 85° C. Stirring was then discontinued and the reaction mixture allowed to phase separate. The aqueous phase was drained. The organic phase was stripped for 1 hour at 120° C. under 50 mm Hg pressure. The stripped organic phase was collected as Flexibilizer A, which has the structure HO—Si($CH_3$)$_2$—O—[Si($CH_3$)$_2$O]$_m$—[Si(Ph)$_2$O]$_n$—Si($CH_3$)$_2$—OH where m/n is 4.42.

Preparation of Active Hydrogen-containing Resin (ii)

Preparation of acrylic polymer #1 as active hydrogen-containing resin (ii) is described below.

Xylene (205.6 grams) and toluene (126.6 grams) were added into a 2 liter round bottomed 3-necked flask. One neck of the flask was connected to a U tube which is connected to a water condenser and a temperature probe with nitrogen. The second neck of the flask was connected to a mechanical stirrer having a Teflon shaft and blade. The third neck of the flask was attached to a 500 ml addition funnel.

The materials listed in Table 1 were mixed in a 1 liter bottle, and then transferred to the addition funnel.

TABLE 1

| Materials | wt/gm |
|---|---|
| Styrene monomer | 121.3 |
| Methyl methacrylate | 117.3 |

TABLE 1-continued

| Materials | wt/gm |
|---|---|
| Isobornyl methacrylate | 117.3 |
| Butyl acrylate | 54.6 |
| Ethylhexylacrylate | 54.5 |
| Hydroxy propyl acrylate | 60.5 |
| AIBN (2,2'Azobis(2-methylpropionitrile) | 30.1 |

Mixture of xylene and toluene was heated to its reflux temperature. Then materials listed in Table 1 were added drop wise from the addition funnel to the flask at a uniform addition rate of 2.5 gram per minute over a 4 hour period. The temperature within the flask was maintained at reflux temperature.

The materials listed in Table 2 were mixed in a 1 liter bottle, and then transferred to the addition unreel after the addition of materials listed in Table 1.

TABLE 2

| Materials | wt/gm |
|---|---|
| AIBN (2,2'Azobis(2-methylpropionitrile) | 1.8 |
| Xylene | 18.8 |
| Toluene | 11.5 |
| Triethyl Ortho Formate | 10.0 |

The materials listed in Table 2 were added drop wise from the addition funnel to the flask at a uniform addition rate of 1.5 grams per minute over a 30 minutes period. The temperature within the flask was maintained at 130° C. for additional 30 minutes, then cooled down to room temperature. The mixed solvent of xylene and toluene contained 64% solid acrylic polymer #1.

Preparation of Acrylic Polymer #2 as Active Hydrogen-containing Resin (ii) is Described below.

Xylene (205.6 grams) and toluene (126.6 grams) were added into a 2 liter round bottomed 3-necked flask. One neck of the flask was connected to a U tube which is connected to a water condenser and a temperature probe with nitrogen. The second neck of the flask was connected to a mechanical stirrer having a Teflon shaft and blade. The third neck of the flask was attached to a 500 ml addition funnel.

The materials listed in Table 3 were mixed in a 1 liter bottle, and then transferred to the addition funnel.

TABLE 3

| Materials | wt/gm |
|---|---|
| Styrene monomer | 121.3 |
| Methyl methacrylate | 117.3 |
| Isobornyl methacrylate | 117.3 |
| Butyl acrylate | 54.5 |
| Ethylhexylacrylate | 54.5 |
| Hydroxy propyl acrylate | 60.5 |
| Gamma-methacryloxypropyltrimethoxysilane | 80.1 |
| AIBN (2,2'Azobis(2-methylpropionitrile) | 30.1 |

Mixture of xylene and toluene was heated to its reflux temperature. Then materials listed in Table 3 were added drop wise from the addition funnel to the flask at a uniform addition rate of 2.5 gram per minute over a 4 hour period. The temperature within the flask was maintained at reflux temperature.

The materials listed in Table 4 were mixed in a 1 liter bottle, and then transferred to the addition funnel after the addition of materials listed in Table 3.

TABLE 4

| Materials | wt/gm |
|---|---|
| AIBN (2,2'Azobis(2-methylpropionitrile) | 1.8 |
| Xylene | 18.8 |
| Toluene | 11.5 |
| Triethyl Ortho Formate | 10.0 |

The materials listed in Table 4 were added drop wise from the addition funnel to the flask at a uniform addition rate of 1.5 g/min over a 30 minutes period. The temperature within the flask was maintained at 130° C. for additional 30 minutes, then cooled down to room temperature. The mixed solvent of xylene and toluene contained 66% solid acrylic polymer #2.

Preparation of Rheological Additive #1 is Described below.

Acrylic polymer #1 (15.7 grams) was added to a 200 ml plastic beaker. Then 2.0 grams of Aerosil R812 (fumed silica) and 13.7 grams of N-butyl acetate were added drop wise over 15 minutes. After all materials were added to the beaker, a Cowles blade, under low shear speed conditions, was used to create the agitation necessary to mix the materials together for approximately 10 minutes. Then zirconium grind beads were added to the beaker to grind the fumed silica into the acrylic polyol to a Hegman Fineness of 6.0. This procedure took approximately 30 minutes. Afterwards, the mixture was filtered through a nylon mesh which removed the rheological additive #1 from the zirconium grind beads.

Preparation of Rheological Addditive #2 is Described below.

Acrylic polymer #2 (15.1 grams) was added to a 200 ml plastic beaker. Then 2.0 grams of Aerosil R812 (fumed silica) and 13.7 grams of n-butyl acetate were added drop wise over 15 minutes. After all materials were added to the beaker, a Cowles blade, under low shear speed conditions, was used to create the agitation necessary to mix the materials together for approximately 10 minutes. Then zirconium grind beads were added to the beaker to grind the fumed silica into the acrylic polyol to a Hegman Fineness of 6.0. This procedure took approximately 30 minutes. Afterwards, the mixture was filtered through a nylon mesh which removed the rheological additive #2 from the zirconium grind beads.

Preparation of Catalyst Solution #1 is Described below.

n-Butyl acetate (9.5 grams) and dibutyl tin dilaurate (0.5 grams) were added to a 50 ml plastic beaker. Once all the materials were added, slow agitation was employed to ensure full dissolution of all materials.

Preparation of Curing Agent (vi) is Described below.

Desmodur N3300 (100.00 grams, available from Bayer), 111.11 grams of Vestanat T1890 (available from Evonik Industries), and 3.33 grams of n-butyl acetate were added to a 250 ml beaker using a stirring blade under slow agitation. Once all materials were incorporated, the materials were allowed to mix under medium agitation for an additional 30 minutes to ensure full dissolution of all materials.

Preparations of Coating Compositions are Described below.

The materials used to prepare coating compositions are shown in Table 5 below. Tinuvin 328 and Tinuvin 292 are available from BASK. CoatOSil 2816 is available from Momentive Performance Materials Inc.

TABLE 5

| Material/Solution Wt (gms) | Example 1 | Comparison 1 | Comparison 2 |
|---|---|---|---|
| Flexibilizer (i) | 7.00 | 0 | 0 |
| Acrylic Polymer #1 | — | 152.28 | — |
| Acrylic Polymer #2 | 146.30 | — | 146.30 |
| Rheology Additive #1 | — | 9.42 | — |
| Rheology Additive #2 | 9.24 | — | 9.24 |
| Tinuvin 328 | 3.00 | 3.00 | 3.00 |
| Tinuvin 292 | 1.00 | 1.00 | 1.00 |
| CoatOSil 2816 | 0.10 | 0.10 | 0.10 |
| Catalyst Solution #1 | 5.00 | 5.00 | 5.00 |
| n-Butyl Acetate | 30.00 | 30.00 | 30.00 |
| Methyl Ethyl Ketone | 25.00 | 25.00 | 25.00 |
| Curing agent (vi) | 19.60 | 18.14 | 16.52 |

Materials listed in Table 5 with the exception of curing agent (vi) were added to a 250 ml beaker using a stirring blade under slow agitation. Then, curing agent (vi) was added to the beaker. Once all materials were added, the compositions were allowed to mix under medium agitation for an additional 30 minutes to ensure full dissolution of all materials.

Cleaning and Preparation of Cold Roll Steel Panels

The substrates used for testing were Cold Roll Steel APR10184 panels available from ACT Test Panels. A cleaning solution was prepared be mixing Triton X-100 (0.06 weight percent, available from Aldrich), sodium metasilicate (anhydrous, 0.52 weight percent, available from Aldrich), sodium carbonate (anhydrous, 0.49 weight percent, available from Aldrich), sodium phosphate, dibasic (anhydrous, 0.35 weight percent, available from Aldrich) and de-ionized water (98.57 weight percent). The clean solution was heated to a temperature of from 65° C. to 70° C. The Cold Roll Steel panels were immersed in heated and stirred cleaning solution for 2 to 3 minutes to remove any oil contaminants. The panels were then removed from the solution and immediately rinsed with de-ionized water. Kimwipe Kimtech Delicate Task Wipers, available from Kimberly Clark, were used to wipe the panels dry. The panels were then lightly sprayed with water to determine the water break of the cleaned panels. If the panels showed water beading, then the cleaning process was repeated. If the water formed a continuous sheen, then the panels were then dried with a Kimwipe wiper and stored for use in a desiccant chamber.

Procedure for Spray Application

Each coating composition was spray applied over cleaned metal panels which were cut into 2-inch by 4-inch (5.08-centimeter by 10.16-centimeter) dimensions. Spray application was conducted with a Starting Line High Volume Low Pressure gravity fed siphon spray hand held spraygun, available through DeVilbiss. The coating compositions were sprayed at a gauge pressure near the gun of 25 lb/in$^2$ (172 kilopascal). The spray application technique was a side-to-side sweep of the spray onto the panel at a rate of approximately 800 inch per minute (20 meters per minute), indexing up and down the panels at approximately 1 inch (2.54 centimeters) per sweep. Several panels were prepared simultaneously and one entire pass along the entire panel set would encompass approximately 5 to 6 sweeps. Each set of panels was prepared to have about 3.5 to 4.5 mils (88.9 to 114.3 microns) dry film thickness, of each coating formulation.

Procedure for Panel Curing

One set of the spray applied coating composition was cured at ambient conditions while another set from the same spray applied coating composition was flash dried at ambient conditions for a period no less than 15 minutes, but no more than 40 minutes, then cured for 30 minutes at 250° F. (121° C.). These cure procedures were repeated for the other panels as well. Both panel sets were then conditioned for approximately 6 days before additional testing began.

Procedure for Panel Flexibility Testing

After approximately six days of ambient conditioning, the panels, from both sets, were placed into an oven for thermal conditioning at 80° C. (176° F.) for approximately 60 hours. After removal from the oven, the coated panels were allowed to cool to room temperature before being subjected to Conical Mandrel bending. Average dry film thicknesses were between ~3.9±0.3 mils (~99 microns).

Mandrel Bending was performed in accordance with ASTM-D522 at approximately 1¼" to 1½" conical diameter with average bend diameter of 1 and ⅜"-inch (3.49 centimeter) diameter bend section of the instrument. The flexibility results on conical mandrel bend were shown in Table 6. The panels were rated either as a PASS, where the samples showed no evidence of cracking after bending, or a FAIL, where the panel showed evidence of multiple cracks and/or delamination. DCU2010 and DCX2011 are available from PPG Industries.

TABLE 6

| Conditioning | Example 1 | Comparison 1 | Comparison 2 | Comparison 3 (DCU2010/ DCX2011) |
|---|---|---|---|---|
| Room Temperature Cure for ~6 days week followed by ~60 hrs @ 80° C. | PASSED | FAILED Severe Cracking | FAILED Severe Cracking | PASSED |
| Flashed 1 hr, then Cured for 30 minutes at 250° F., followed by ambient storage for ~6 days, followed by ~60 hrs @ 80° C. | PASSED | FAILED Severe Cracking | FAILED Severe Cracking | PASSED |

Procedure for Measuring Coated Panel Gloss

House of Kolor SB-26 white base available from Valspar was spray applied on panels prior to the application of clear coat.

Gloss measurements were carried out in accordance with ASTM D523 on coated panels. Gloss was measured using a Byk-Gardner micro-TRI Glossmeter.

CIE L*a*b* Color, daylight at the 65° angle (D65), measurements were taken using a Konica Minolta CR-400 colorimeter set up for automatically taking 3 sample measurements, then averaging the result for color on the L*a*b* scale. QUV-B accelerated weathering results on ambient cured panels and 60° gloss results as a function time in QUV-B are shown in Table 7.

TABLE 7

| Conditioning | Example 1 | Comparison 1 | Comparison 2 | Comparison 3 (DCU2010/ DCX2011) |
|---|---|---|---|---|
| Initial 60° C. Gloss | 90.2 | 91.5 | 89.0 | 90.3 |

TABLE 7-continued

| Conditioning | Example 1 | Comparison 1 | Comparison 2 | Comparison 3 (DCU2010/ DCX2011) |
|---|---|---|---|---|
| 60° C. Gloss after 30 Days | 93.0 | 94.2 | 93.8 | 93.8 |

Procedure for QUV-B Testing

House of Kolor SB-26 white base available from Valspar was spray applied on panels prior to the application of clear coat.

The Accelerated Weather Chamber used was a Q-Panel Company, Q-U-V Accelerated Weathering Tester, 26200 First St. Cleveland, Ohio 44145.

The bulbs used were for QUV-B testing and the Weathering test was set for an entire 24 hour cycle of QUV-B light. QUV-B accelerated weathering results on ambient cured panels and ΔE color change as a function of time in QUV-B are shown in Table 8.

TABLE 8

| Conditioning | Example 1 | Comparison 1 | Comparison 2 | Comparison 3 (DCU2010/ DCX2011) |
|---|---|---|---|---|
| ΔE Color Change after 30 Days | 2.77 | 3.47 | 2.96 | 13.01 |

Procedure for Pendulum Hardness Testing

Pendulum Hardness measurements were carried out on the coated panels. The Konig pendulum apparatus was used and the motion of swing began at the 12° angle. This provided greater surface hardness resolution of the coated panels. Pendulum hardness measurements after seven days are shown in Table 9. Pendulum hardness measurements after fourteen days are shown in Table 10. Pendulum hardness measurements after twenty eight days are shown in Table 11.

TABLE 9

| Conditioning | Example 1 | Comparison 1 | Comparison 2 | Comparison 3 (DCU2010/ DCX2011) |
|---|---|---|---|---|
| Room Temperature Cured for ~7 days | 105 | 88 | 84 | 59 |
| Flashed 1 hr, then Cured for 30 minutes at 250° F., followed by ambient storage for ~7 days | 219 | 215 | 218 | 201 |

TABLE 10

| Conditioning | Example 1 | Comparison 1 | Comparison 2 | Comparison 3 (DCU2010/ DCX2011) |
|---|---|---|---|---|
| Room Temperature Cured for ~14 days | 137 | 107 | 102 | 71 |

TABLE 10-continued

| Conditioning | Example 1 | Comparison 1 | Comparison 2 | Comparison 3 (DCU2010/ DCX2011) |
|---|---|---|---|---|
| Flashed 1 hr, then Cured for 30 minutes at 250° F., followed by ambient storage for ~14 days | 228 | 207 | 220 | 213 |

TABLE 11

| Conditioning | Example 1 | Comparison 1 | Comparison 2 | Comparison 3 (DCU2010/ DCX2011) |
|---|---|---|---|---|
| Room Temperature Cured for ~28 days | 157 | 113 | 120 | 93 |
| Flashed 1 hr, then Cured for 30 minutes at 250° F., followed by ambient storage for ~28 days | 235 | 218 | 235 | 222 |

The harder the surface of the film, the higher the number of pendulum swings, and the higher the number of swing counts. The softer the film was, the lower the number of swing counts (cycles).

Procedure for Sulfuric Acid Etch Testing

A solution of 10% wt concentration of sulfuric acid was prepared for determining clearcoat acid etch resistance as a function of temperature. A drop of this solution was placed onto each panel and then placed into an oven beginning at 30° C. After 20 minutes in the oven, the coated panels were removed, wiped dry and allowed to cool. The coated panels were then checked for acid etch markings caused by the chemical attack of the sulfuric acid on the coated surface. The oven temperature was raised incrementally by 5° C., and the drop test was repeated in a similar fashion on the coated panels until a maximum temperature of 70° C. was reached. The temperature at which etching occurred is shown in Table 12. Resultant temperature leaving no etch mark on coating surface.

TABLE 12

| Conditioning | Example 1 | Comparison 1 | Comparison 2 | Comparison 3 (DCU2010/ DCX2011) |
|---|---|---|---|---|
| Panels cured 30 minutes @ 250° F. | 55° C. | 50° C. | 50° C. | 40° C. |

These data indicate that the composition of Example 1 containing the flexibilizer (i) provided for improved flexibility (Passed) and hardness (105) when cured at room temperature for 7 days, as compared to a similar composition, Comparison 2, which failed the flexibility and had a hardness of only 84, or the commercial coating, Comparison 3, which passed the flexibility but had a hardness of only 59.

These examples are to be construed as exemplary in nature only and are not intended in any way to limit the appended claims. It is contemplated that a person having ordinary skill in the art would be able to produce obvious variations of the subject matter and disclosures herein contained that would be by reason of such ordinary skill within the literal or equitable scope of the appended claims.

What is claimed is:

1. A composition comprising:
(a) flexibilizer (i) having the general formula (I):

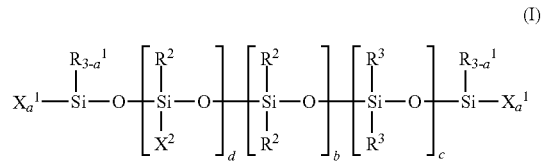

wherein:
each occurrence of $R^1$ is independently an alkyl group having from 1 to 6 carbon atoms, a phenyl group or an arenyl group having 7 to 12 carbon atoms;
each occurrence of $R^2$ is independently an alkyl group having from 1 to 6 carbon atoms;
each occurrence of $R^3$ is independently a phenyl group or an arenyl group having 7 to 12 carbon atoms;
each occurrence of $X^1$ is independently a hydroxyl group, methoxy or ethoxy group;
each occurrence of $X^2$ is independently a hydroxyl group, an alkoxy group having from 1 to 6 carbon atoms, an alkoxy group having from 1 to 6 carbon atoms and at least one ether or ester functional group, or a group with the formula (II):

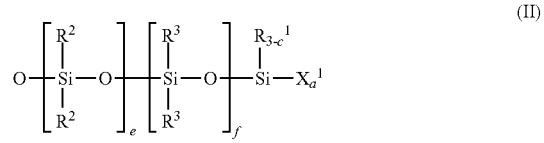

wherein:
$R^1$, $R^2$ and $R^3$ are the same as defined above;
each occurrence of subscripts a, b, c, d, e and f is independently an integer wherein a is 1 to 3; b is 0 to 500, c is 1 to 500, d is 0, e is 0 to 50, and f is 0 to 50 with the proviso that
the molar ratio of b to c is from 2:1 to 7:1; and
(b) at least one active hydrogen-containing resin (ii), wherein said resin (ii) is a polyol (iii) selected from the group consisting of acrylic polyol, polyester polyol, hydroxyl-terminated polybutadiene and acrylic polyol containing an alkoxysilyl group; and,
(c) at least one curing agent (vi) selected from the group consisting of isocyanate-containing compound (vii), blocked isocyanate-containing compound (viii) and aminoplast (ix), provided that the amount of flexibilizer (i) used in the composition is from 1 to 30 parts by weight per one parts of active hydrogen-containing resin (ii) and the curing agent (vi) is used in the amount of 1.0 to 3 equivalents, based upon the active hydrogen content of the active hydrogen-containing resin (ii).

2. The composition of claim 1 wherein each occurrence of $X^1$ is Hydroxyl; $R^1$ is methyl or phenyl; $R^2$ is methyl; $R^3$ is phenyl; b is 1 to 100; and c is 2 to 100.

3. The composition of claim 1 wherein flexibilizer (i) has a silanol content or a $SiX^1$ content of from 2 to 15 mole %, based upon the total number of silicon atoms.

4. The composition of claim 1 wherein flexibilizer (i) has a weight average molecular weight of from 500 to 50,000.

5. The composition of claim 1 wherein polyol (iii) is at least one member selected from the group consisting of acrylic polyol, and acrylic polyol containing a alkoxysilyl group, and mixtures thereof.

6. The composition of claim 1 wherein curing agent (vi) is an isocyanate containing compound (vii) selected from at least one member of the group consisting of 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecane diisocyanate, omega,omega'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate, 2,5- and 3,5-bis(isocyanatomethyl)-8-methyl-1,4-methano-decahydronaphthalene, 1,5-, 2,5-, 1,6- and 2,6-bis(isocyanatomethyl)-4,7-methanohexahydroindane, 1,5-, 2,5-, 1,6- and 2,6-bis(isocyanato)-4,7-methylhexahydroindane, dicyclohexyl 2,4'- and 4,4'-diisocyanate, 2,4- and 2,6-hexahydrotolylene diisocyanate, perhydro 2,4'- and 4,4'-diphenylmethane diisocyanate, omega,omega'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanatodiphenylmethane, naphthylene-1,5-diisocyanate, 2,4- and 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, 2,4,4'-triisocyanatodiphenyl ether, 4,4',4"-triisocyanatotriphenyl methane, toluene 2,4-diisocyanate, toluene 2,6-diisocyanate, diphenylmethane 4,4'-diisoyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, dodecane 1,12-diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate, tetramethylxylyl diisocyanates, biuret dimers and the isocyanurate trimers thereof.

7. The composition of claim 1, further comprising at least one additional component (xi) selected from at least one member of the group consisting of catalyst, organic solvent, polysiloxane resin other than formula (I), isocyanate-reactive scavenging agent, water scavenger agent, desiccant, non-silicon-based epoxy hardener, surfactant, colorant, rheology modifier, plasticizer, extender, filler, reinforcing agent, adhesion promoter, hydrocarbon resin modifier, UV stabilizer, wetting agent, flow and leveling additive, thixotrope and defoamer.

8. The composition of claim 7, wherein the catalyst is at least one member selected from the group consisting of organic tin, zirconium complex, aluminum chelate, titanic chelate, organic zinc, organic cobalt, organic iron, organic nickel and organobismuth, amine catalyst, dibutyltin oxide, dimethyltin diacetate, dimethyltin dilaurate, dimethyltin dineodecanote, dibutyltin dilaurate, dioctyltin dilaurate, dibutyltin diacetate, stannous octoate, stannous acetate, stannous oxide, morpholine, tri-isopropylamine, bis-(2-dimethylaminoethyl) ether and piperazine.

9. The composition of claim 7 wherein the filler is at least one member selected from the group consisting of particulate metal, fumed metal oxide, precipitated metal oxide, precipitated and ground metal carbonate and carbon black, metal sulfate, metal phosphate, silicate, and having a concentration in the range of from 0 to 50 weight percent based on the total weight of components (i), (ii), (vi) and filler.

10. The composition of claim 7 wherein the plasticizer is liquid organic compound selected from at least one member of the group consisting of alkyl phthalate, alkyl sulphate and polyether, alkyl acrylate, and having a concentration in the range up to 40 parts by weight per hundred parts of active hydrogen-containing resin (ii).

11. The composition of claim 7 wherein the water scavenger agent is an alkoxysilane selected from at least one member of the group consisting of vinyltrimethoxysilane and methyltrimethoxysilane, and having a concentration in the range up to 5 percent by weight, based on the weight of active hydrogen-containing resin (ii).

12. The composition of claim 7 wherein the adhesion promoter is an organofunctional alkoxysilane, and having a concentration in the range up to 5 percent by weight, based on the weight of active hydrogen-containing resin (ii).

13. The composition of claim 1 wherein the composition is an adhesive, a sealant, a composite or a coating.

14. The cured composition of claim 1.

15. A substrate comprising the cured composition of claim 14.

16. A substrate having the composition of claim 1 applied thereto.

17. A composition comprising:
(a) flexibilizer (i) having the general formula (I):

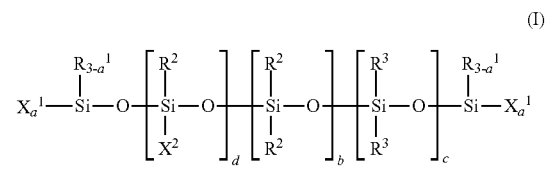

wherein:
each occurrence of $R^1$ is independently an alkyl group having from 1 to 6 carbon atoms, a phenyl group or an arenyl group having 7 to 12 carbon atoms;
each occurrence of $R^2$ is independently an alkyl group having from 1 to 6 carbon atoms;
each occurrence of $R^3$ is independently a phenyl group or an arenyl group having 7 to 12 carbon atoms;
each occurrence of $X^1$ is independently a hydroxyl group, an alkoxy group having from 1 to 6 carbon atoms, or an alkoxy group having from 1 to 6 carbon atoms and at least one ether or ester functional group;
each occurrence of $X^2$ is independently a hydroxyl group, an alkoxy group having from 1 to 6 carbon atoms, an alkoxy group having from 1 to 6 carbon atoms and at least one ether or ester functional group, or a group with the formula (II):

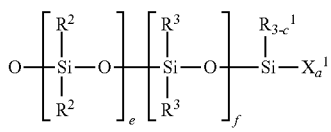

wherein:
R¹, R² and R³ are above;
each occurrence of subscripts a, b, c, d, e and f is independently an integer wherein a is 1 to 3; b is 0 to 500, c is 1 to 500, d is 0 to 10, e is 0 to 50, and f is 0 to 50 with the provisos that
(1) the molar ratio of b to c is from 0:1 to 15:1, and
(2) the molar ratio of d to c is from 0:1 to 1:1,
wherein flexibilizer (i) is HO—Si(CH$_3$)$_2$—O—[Si(CH$_3$)$_2$O]$_r$—[Si(Ph)$_2$O]$_s$—Si(CH$_3$)$_2$—OH where r/s is 4, CH$_3$O—Si(CH$_3$)$_2$—O—[Si(CH$_3$)$_2$O]$_u$—[Si(Ph)$_2$O]$_w$—Si(CH$_3$)$_2$—$_2$—OCH$_3$ where u/w is 3, Ph is phenyl, or mixtures thereof;
(b) at least one active hydrogen-containing resin (ii); and,
(c) at least one curing agent (vi) selected from the group consisting of isocyanate-containing compound (vii), blocked isocyanate-containing compound (viii) and aminoplast (ix).

18. A composition comprising:
(a) flexibilizer (i) having the general formula (I):

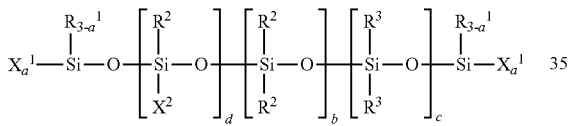

wherein:
each occurrence of R¹ is independently an alkyl group having from 1 to 6 carbon atoms, a phenyl group or an arenyl group having 7 to 12 carbon atoms;
each occurrence of R² is independently an alkyl group having from 1 to 6 carbon atoms;
each occurrence of R³ is independently a phenyl group or an arenyl group having 7 to 12 carbon atoms;
each occurrence of X¹ is independently a hydroxyl group, an alkoxy group having from 1 to 6 carbon atoms, or an alkoxy group having from 1 to 6 carbon atoms and at least one ether or ester functional group;
each occurrence of X² is independently a hydroxyl group, an alkoxy group having from 1 to 6 carbon atoms, an alkoxy group having from 1 to 6 carbon atoms and at least one ether or ester functional group, or a group with the formula (II):

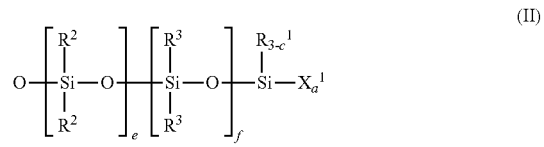

wherein:
R¹, R² and R³ are the same as defined above;
each occurrence of subscripts a, b, c, d, e and f is independently an integer wherein a is 1 to 3; b is 0 to 500, c is 1 to 500, d is 0 to 10, e is 0 to 50, and f is 0 to 50 with the provisos that
(1) the molar ratio of b to c is from 0:1 to 15:1, and
(2) the molar ratio of d to c is from 0:1 to 1:1;
(b) at least one active hydrogen-containing resin (ii), wherein said resin (ii) is a polyol (iii), which is an acrylic polyol containing an alkoxysilyl group and
(c) at least one curing agent (vi), which is a polyisocyanate.

\* \* \* \* \*